(12) United States Patent
Pickelsimer et al.

(10) Patent No.: US 8,973,049 B2
(45) Date of Patent: Mar. 3, 2015

(54) CONTENT RECOMMENDATIONS

(75) Inventors: Lisa A. Pickelsimer, Atlanta, GA (US);
Anant Patil, Marietta, GA (US);
Catherine Elizabeth Thompson,
Roswell, GA (US)

(73) Assignee: Cox Communications, Inc., Atlanta, GA (US)

( * ) Notice: Subject to any disclaimer, the term of this patent is extended or adjusted under 35 U.S.C. 154(b) by 647 days.

(21) Appl. No.: 12/959,665

(22) Filed: Dec. 3, 2010

(65) Prior Publication Data
US 2011/0138423 A1 Jun. 9, 2011

Related U.S. Application Data

(60) Provisional application No. 61/266,670, filed on Dec. 4, 2009.

(51) Int. Cl.
| | |
|---|---|
| *H04N 7/173* | (2011.01) |
| *G06F 7/00* | (2006.01) |
| *G06F 15/00* | (2006.01) |
| *H04N 5/445* | (2011.01) |
| *H04N 21/443* | (2011.01) |
| *H04N 21/45* | (2011.01) |
| *H04N 21/482* | (2011.01) |

(52) U.S. Cl.
CPC ....... *H04N 5/44543* (2013.01); *H04N 21/4438* (2013.01); *H04N 21/4532* (2013.01); *H04N 21/4826* (2013.01)
USPC ................................ 725/52; 725/43; 725/53

(58) Field of Classification Search
CPC ............ H04N 21/482; H04N 21/4826; H04N 21/4828
USPC ................................................. 725/46, 52–53
See application file for complete search history.

(56) References Cited

U.S. PATENT DOCUMENTS

| | | | |
|---|---|---|---|
| 5,565,909 A | 10/1996 | Thibadeau et al. | |
| 5,583,560 A | * 12/1996 | Florin et al. | ................. 725/40 |
| 5,808,662 A | 9/1998 | Kinney et al. | |

(Continued)

FOREIGN PATENT DOCUMENTS

JP 2002-218428 8/2002

OTHER PUBLICATIONS

U.S. Appl. No. 13/221,151, filed Aug. 30, 2011 entitled "Sharing Digitally Recorded Content".

(Continued)

*Primary Examiner* — Jason J Chung
*Assistant Examiner* — Carmine Malangone
(74) *Attorney, Agent, or Firm* — Merchant & Gould P.C.

(57) ABSTRACT

Content recommendations may be provided. First, in response to a received input and concurrent with a shrunken programming content, a media guide may be displayed. The media guide may comprise a first card, a second card, and a third card. The first card may comprise a plurality of recommendation types. The second card may comprise a plurality of subcategories corresponding to a selected one of the plurality of recommendation types. The third card may comprise a plurality of content program names corresponding to a selected one of the plurality of subcategories. The plurality of content program names may be in an order. Next, in response to a selection of a one of the plurality of content program names, an action card may be displayed. Then a selected one of the plurality of actions may be executed.

23 Claims, 17 Drawing Sheets

(56) References Cited

U.S. PATENT DOCUMENTS

| | | |
|---|---|---|
| 5,812,123 A | 9/1998 | Rowe et al. |
| 5,818,439 A | 10/1998 | Nagasaka et al. |
| 5,861,906 A | 1/1999 | Dunn et al. |
| 6,144,375 A | 11/2000 | Jain et al. |
| 6,188,398 B1 | 2/2001 | Collins-Rector et al. |
| 6,282,713 B1 | 8/2001 | Kitsukawa et al. |
| 6,438,579 B1 | 8/2002 | Hosken |
| 6,615,248 B1 | 9/2003 | Smith |
| 6,754,904 B1 | 6/2004 | Cooper et al. |
| 6,934,963 B1 | 8/2005 | Reynolds et al. |
| 6,968,364 B1 | 11/2005 | Wong et al. |
| 6,983,426 B1 | 1/2006 | Kobayashi et al. |
| 7,017,173 B1 | 3/2006 | Armstrong et al. |
| 7,080,139 B1 | 7/2006 | Briggs et al. |
| 7,228,305 B1 | 6/2007 | Eyal et al. |
| 7,246,367 B2 | 7/2007 | Livonen |
| 7,249,366 B1 | 7/2007 | Flavin |
| 7,272,844 B1 | 9/2007 | Bankers et al. |
| 7,290,211 B2 * | 10/2007 | Goodwin et al. ............. 715/716 |
| 7,363,644 B2 | 4/2008 | Wugofski |
| 7,584,214 B2 | 9/2009 | Narahara et al. |
| 7,596,761 B2 | 9/2009 | Lemay et al. |
| 7,669,219 B2 | 2/2010 | Scott, III |
| 7,673,315 B1 | 3/2010 | Wong et al. |
| 7,685,204 B2 | 3/2010 | Rogers |
| 7,698,263 B2 | 4/2010 | Pickelsimer et al. |
| 7,716,376 B1 | 5/2010 | Price et al. |
| 7,877,293 B2 * | 1/2011 | Biebesheimer et al. ... 705/26.64 |
| 7,886,327 B2 | 2/2011 | Stevens |
| 7,895,625 B1 | 2/2011 | Bryan et al. |
| 7,904,924 B1 | 3/2011 | de Heer et al. |
| 7,933,789 B2 | 4/2011 | Boland et al. |
| 7,992,163 B1 | 8/2011 | Jerding et al. |
| 8,090,606 B2 | 1/2012 | Svendsen |
| 8,091,032 B2 | 1/2012 | Fischer |
| 8,220,021 B1 | 7/2012 | Look et al. |
| 8,364,013 B2 | 1/2013 | Nijim |
| 8,418,204 B2 | 4/2013 | Pickelsimer et al. |
| 2001/0001160 A1 | 5/2001 | Shoff et al. |
| 2001/0037367 A1 | 11/2001 | Iyer |
| 2002/0007485 A1 | 1/2002 | Rodriguez et al. |
| 2002/0056123 A1 | 5/2002 | Liwerant et al. |
| 2002/0057297 A1 | 5/2002 | Grimes et al. |
| 2002/0069218 A1 | 6/2002 | Sull et al. |
| 2002/0087982 A1 | 7/2002 | Stuart |
| 2002/0120757 A1 | 8/2002 | Sutherland et al. |
| 2002/0124252 A1 | 9/2002 | Schaefer et al. |
| 2002/0128831 A1 | 9/2002 | Ju et al. |
| 2002/0144273 A1 | 10/2002 | Reto |
| 2002/0156852 A1 | 10/2002 | Hughes et al. |
| 2002/0174430 A1 | 11/2002 | Ellis et al. |
| 2002/0194195 A1 | 12/2002 | Fenton et al. |
| 2002/0199188 A1 | 12/2002 | Sie et al. |
| 2003/0002849 A1 | 1/2003 | Lord |
| 2003/0021582 A1 | 1/2003 | Sawada |
| 2003/0084449 A1 | 5/2003 | Chane et al. |
| 2003/0093790 A1 | 5/2003 | Logan et al. |
| 2003/0093806 A1 | 5/2003 | Dureau et al. |
| 2003/0112467 A1 * | 6/2003 | McCollum et al. .......... 358/1.18 |
| 2003/0115592 A1 | 6/2003 | Johnson |
| 2003/0154477 A1 | 8/2003 | Hassell et al. |
| 2003/0156827 A1 | 8/2003 | Janevski |
| 2003/0177497 A1 | 9/2003 | Macrae et al. |
| 2003/0206710 A1 | 11/2003 | Ferman et al. |
| 2003/0208763 A1 | 11/2003 | McElhatten et al. |
| 2003/0220100 A1 * | 11/2003 | McElhatten et al. .......... 455/418 |
| 2003/0225846 A1 | 12/2003 | Heikes et al. |
| 2003/0229900 A1 | 12/2003 | Reisman |
| 2004/0034867 A1 | 2/2004 | Rashkovskiy et al. |
| 2004/0060063 A1 | 3/2004 | Russ et al. |
| 2004/0064835 A1 | 4/2004 | Bellwood et al. |
| 2004/0078807 A1 | 4/2004 | Fries et al. |
| 2004/0078814 A1 | 4/2004 | Allen |
| 2004/0103167 A1 | 5/2004 | Grooters et al. |
| 2004/0117786 A1 | 6/2004 | Kellerman et al. |
| 2004/0210928 A1 | 10/2004 | Hamzy et al. |
| 2004/0255336 A1 | 12/2004 | Logan et al. |
| 2004/0255340 A1 | 12/2004 | Logan |
| 2004/0268386 A1 | 12/2004 | Logan et al. |
| 2005/0022241 A1 | 1/2005 | Griggs |
| 2005/0028208 A1 | 2/2005 | Ellis et al. |
| 2005/0044565 A1 * | 2/2005 | Jerding et al. ................. 725/37 |
| 2005/0055710 A1 | 3/2005 | Aoki et al. |
| 2005/0076363 A1 * | 4/2005 | Dukes et al. ................... 725/46 |
| 2005/0091316 A1 | 4/2005 | Ponce et al. |
| 2005/0149880 A1 | 7/2005 | Postrel |
| 2005/0210145 A1 | 9/2005 | Kim et al. |
| 2005/0246739 A1 | 11/2005 | Davidson |
| 2005/0251820 A1 | 11/2005 | Stefanik et al. |
| 2005/0262542 A1 | 11/2005 | DeWeese et al. |
| 2005/0278443 A1 | 12/2005 | Winner et al. |
| 2005/0278740 A1 * | 12/2005 | Helms ............................ 725/41 |
| 2005/0278761 A1 | 12/2005 | Gonder et al. |
| 2005/0283813 A1 | 12/2005 | Jamail et al. |
| 2006/0005207 A1 | 1/2006 | Louch et al. |
| 2006/0020904 A1 | 1/2006 | Aaltonen et al. |
| 2006/0031882 A1 | 2/2006 | Swix et al. |
| 2006/0041927 A1 | 2/2006 | Stark et al. |
| 2006/0059514 A1 | 3/2006 | Hsiao et al. |
| 2006/0059526 A1 | 3/2006 | Poslinski |
| 2006/0075019 A1 | 4/2006 | Donovan et al. |
| 2006/0080408 A1 | 4/2006 | Istvan et al. |
| 2006/0090183 A1 | 4/2006 | Zito et al. |
| 2006/0112325 A1 | 5/2006 | Ducheneaut et al. |
| 2006/0130093 A1 | 6/2006 | Feng et al. |
| 2006/0143236 A1 | 6/2006 | Wu |
| 2006/0161950 A1 | 7/2006 | Imai et al. |
| 2006/0174277 A1 | 8/2006 | Sezan et al. |
| 2006/0184972 A1 | 8/2006 | Rafey et al. |
| 2006/0190966 A1 | 8/2006 | McKissick et al. |
| 2006/0195479 A1 | 8/2006 | Spiegelman et al. |
| 2006/0248557 A1 | 11/2006 | Stark et al. |
| 2006/0253874 A1 | 11/2006 | Stark et al. |
| 2006/0259926 A1 | 11/2006 | Scheelke et al. |
| 2006/0271959 A1 | 11/2006 | Jacoby et al. |
| 2006/0282856 A1 | 12/2006 | Errico et al. |
| 2007/0033533 A1 | 2/2007 | Sull |
| 2007/0061835 A1 | 3/2007 | Klein et al. |
| 2007/0106627 A1 | 5/2007 | Srivastava et al. |
| 2007/0123353 A1 | 5/2007 | Smith |
| 2007/0124795 A1 | 5/2007 | McKissick et al. |
| 2007/0150918 A1 | 6/2007 | Carpenter et al. |
| 2007/0186180 A1 | 8/2007 | Morgan |
| 2007/0186231 A1 | 8/2007 | Haeuser et al. |
| 2007/0186243 A1 | 8/2007 | Pettit et al. |
| 2007/0198532 A1 | 8/2007 | Krikorian et al. |
| 2007/0214473 A1 | 9/2007 | Barton et al. |
| 2007/0220566 A1 | 9/2007 | Ahmad-Taylor |
| 2007/0245367 A1 | 10/2007 | Ogawa |
| 2007/0256103 A1 | 11/2007 | Knudson |
| 2007/0271338 A1 | 11/2007 | Anschutz |
| 2007/0277205 A1 | 11/2007 | Grannan |
| 2007/0282949 A1 | 12/2007 | Fischer et al. |
| 2007/0294726 A1 * | 12/2007 | Drazin ............................ 725/39 |
| 2007/0298401 A1 | 12/2007 | Mohanty et al. |
| 2008/0010153 A1 | 1/2008 | Pugh-O'Connor et al. |
| 2008/0022320 A1 | 1/2008 | VerSteeg |
| 2008/0036917 A1 | 2/2008 | Pascarella et al. |
| 2008/0040370 A1 | 2/2008 | Bosworth et al. |
| 2008/0052371 A1 | 2/2008 | Partovi et al. |
| 2008/0065758 A1 | 3/2008 | Narayanaswami |
| 2008/0066111 A1 | 3/2008 | Ellis et al. |
| 2008/0066114 A1 | 3/2008 | Carlson et al. |
| 2008/0082606 A1 | 4/2008 | Gupta et al. |
| 2008/0086456 A1 | 4/2008 | Rasanen et al. |
| 2008/0092168 A1 | 4/2008 | Logan et al. |
| 2008/0098323 A1 | 4/2008 | Vallone et al. |
| 2008/0114861 A1 | 5/2008 | Gildred |
| 2008/0126936 A1 | 5/2008 | Williams |
| 2008/0155600 A1 | 6/2008 | Klappert et al. |
| 2008/0163307 A1 | 7/2008 | Coburn et al. |
| 2008/0168506 A1 | 7/2008 | Pickelsimer et al. |
| 2008/0168515 A1 | 7/2008 | Benson et al. |
| 2008/0177727 A1 | 7/2008 | Pickelsimer et al. |

(56) References Cited

U.S. PATENT DOCUMENTS

| | | | |
|---|---|---|---|
| 2008/0178218 A1 | 7/2008 | Pickelsimer et al. | |
| 2008/0235733 A1 | 9/2008 | Heie et al. | |
| 2008/0247730 A1 | 10/2008 | Barton et al. | |
| 2008/0263595 A1 | 10/2008 | Sumiyoshi et al. | |
| 2008/0276278 A1 | 11/2008 | Krieger et al. | |
| 2008/0288596 A1 | 11/2008 | Smith et al. | |
| 2008/0313541 A1 | 12/2008 | Shafton et al. | |
| 2008/0320139 A1 | 12/2008 | Fukuda et al. | |
| 2009/0019374 A1 | 1/2009 | Logan et al. | |
| 2009/0049098 A1 | 2/2009 | Pickelsimer et al. | |
| 2009/0049118 A1 | 2/2009 | Stevens | |
| 2009/0049473 A1 | 2/2009 | Pickelsimer et al. | |
| 2009/0055743 A1 | 2/2009 | Pickelsimer et al. | |
| 2009/0055868 A1 | 2/2009 | Wehmeyer et al. | |
| 2009/0063994 A1 | 3/2009 | Pickelsimer et al. | |
| 2009/0094643 A1 | 4/2009 | Pickelsimer et al. | |
| 2009/0100469 A1 | 4/2009 | Conradt et al. | |
| 2009/0125843 A1 | 5/2009 | Billmaier et al. | |
| 2009/0172127 A1 | 7/2009 | Srikanth et al. | |
| 2009/0172543 A1 | 7/2009 | Cronin et al. | |
| 2009/0178081 A1 | 7/2009 | Goldenberg et al. | |
| 2009/0199242 A1 | 8/2009 | Johnson et al. | |
| 2009/0307719 A1 | 12/2009 | Clark et al. | |
| 2009/0310933 A1 | 12/2009 | Lee | |
| 2009/0313664 A1 | 12/2009 | Patil et al. | |
| 2010/0042746 A1 | 2/2010 | Keum et al. | |
| 2010/0064320 A1* | 3/2010 | Angiolillo et al. | 725/46 |
| 2010/0107194 A1 | 4/2010 | McKissick et al. | |
| 2010/0175084 A1 | 7/2010 | Ellis et al. | |
| 2010/0192173 A1 | 7/2010 | Mizuki et al. | |
| 2011/0010744 A1 | 1/2011 | Stecyk et al. | |
| 2011/0013885 A1 | 1/2011 | Wong et al. | |
| 2011/0072455 A1 | 3/2011 | Pickelsimer et al. | |
| 2011/0090402 A1 | 4/2011 | Huntington et al. | |
| 2011/0107389 A1 | 5/2011 | Chakarapani | |
| 2011/0131600 A1 | 6/2011 | Howcroft et al. | |
| 2011/0202945 A1 | 8/2011 | Pickelsimer et al. | |
| 2011/0283313 A1 | 11/2011 | Gathen et al. | |
| 2012/0051717 A1 | 3/2012 | Nijim | |
| 2012/0054808 A1 | 3/2012 | Nijim | |
| 2012/0054810 A1 | 3/2012 | Nijim | |
| 2012/0222056 A1 | 8/2012 | Donoghue et al. | |
| 2012/0284744 A1 | 11/2012 | Kumar | |
| 2013/0167168 A1 | 6/2013 | Ellis et al. | |

OTHER PUBLICATIONS

U.S. Final Office Action dated Sep. 29, 2011 in U.S. Appl. No. 12/126,096.
U.S. Office Action dated Dec. 28, 2011 in U.S. Appl. No. 12/545,099, 13 pgs.
U.S. Office Action dated Jan. 5, 2012 in U.S. Appl. No. 12/126,096, 20 pgs.
U.S. Office Action dated Dec. 19, 2012 in U.S. Appl. No. 12/126,025, 30 pgs.
U.S. Final Office Action dated Dec. 28, 2012 in U.S. Appl. No. 12/126,126, 24 pgs.
U.S. Office Action dated Mar. 26, 2012 in U.S. Appl. No. 12/126,060, 26 pgs.
U.S. Office Action dated Apr. 26, 2011 in U.S. Appl. No. 12/126,096.
U.S. Office Action dated Jun. 7, 2011 in U.S. Appl. No. 11/651,140.
U.S. Final Office Action dated Jun. 13, 2011 in U.S. Appl. No. 12/126,060.
U.S. Final Office Action dated Jun. 21, 2011 in U.S. Appl. No. 12/126,025.
U.S. Final Office Action dated May 31, 2012 in U.S. Appl. No. 12/126,165, 23 pgs.
U.S. Office Action dated Jun. 5, 2012 in U.S. Appl. No. 12/126,126, 40 pgs.
U.S. Office Action dated Jun. 20, 2012 in U.S. Appl. No. 12/959,731, 30 pgs.
U.S. Office Action dated Feb. 14, 2011 in U.S. Appl. No. 12/126,025.
U.S. Office Action dated Feb. 17, 2011 in U.S. Appl. No. 12/126,060.
U.S. Office Action dated Feb. 18, 2011 in U.S. Appl. No. 12/545,099.
U.S. Office Action dated Feb. 28, 2011 in U.S. Appl. No. 11/651,140.
U.S. Final Office Action dated Mar. 2, 2011 in U.S. Appl. No. 11/787,732.
U.S. Final Office Action dated Mar. 2, 2011 in U.S. Appl. No. 12/126,165.
U.S. Final Office Action dated Aug. 15, 2012 in U.S. Appl. No. 12/126,025, 33 pgs.
U.S. Final Office Action dated Aug. 23, 2012 in U.S. Appl. No. 12/126,060, 30 pgs.
U.S. Final Office Action dated Aug. 29, 2012 in U.S. Appl. No. 12/868,838, 7 pgs.
U.S. Office Action dated Nov. 5, 2012 in U.S. Appl. No. 12/126,096, 23 pgs.
U.S. Office Action dated Nov. 20, 2012 in U.S. Appl. No. 13/221,151, 29 pgs.
U.S. Office Action dated Nov. 29, 2012 in U.S. Appl. No. 12/868,824, 33 pgs.
U.S. Office Action dated Jan. 18, 2012 in U.S. Appl. No. 12/126,025, 27 pgs.
U.S. Office Action dated Jan. 19, 2012 in U.S. Appl. No. 12/126,165, 20 pgs.
U.S. Office Action dated Jan. 19, 2012 in U.S. Appl. No. 11/651,140, 21 pgs.
U.S. Final Office Action dated Apr. 20, 2012 in U.S. Appl. No. 12/126,096, 25 pgs.
U.S. Final Office Action dated Apr. 25, 2012 in U.S. Appl. No. 12/545,099, 16 pgs.
U.S. Final Office Action dated Apr. 25, 2012 in U.S. Appl. No. 11/651,140, 21 pgs.
U.S. Office Action dated May 21, 2012 in U.S. Appl. No. 12/868,838, 22 pgs.
U.S. Office Action dated Sep. 13, 2012 in U.S. Appl. No. 11/651,140, 23 pgs.
U.S. Office Action dated Oct. 4, 2012 in U.S. Appl. No. 12/868,801, 27 pgs.
U.S. Office Action dated Oct. 5, 2012 in U.S. Appl. No. 12/959,793, 31 pgs.
U.S. Office Action dated Oct. 9, 2012 in U.S. Appl. No. 12/545,099, 21 pgs.
U.S. Final Office Action dated Oct. 9, 2012 in U.S. Appl. No. 12/959,731, 19 pgs.
U.S. Office Action dated Oct. 24, 2012 in U.S. Appl. No. 12/126,165, 25 pgs.
U.S. Final Office Action dated Aug. 5, 2011 in U.S. Appl. No. 12/545,099.
U.S. Final Office Action dated Sep. 27, 2011 in U.S. Appl. No. 11/651,140.
Copending U.S. Appl. No. 12/959,731, filed Dec. 3, 2010 entitled "Providing a Media Guide Including Parental Information".
Copending U.S. Appl. No. 12/959,793, filed Dec. 3, 2010 entitled "Personalizing TV Content".
Copending U.S. Appl. No. 12/868,801, filed Aug. 26, 2010 entitled "Content Library".
Copending U.S. Appl. No. 12/868,824, filed Aug. 26, 2010 entitled "Playlist Bookmarking".
Copending U.S. Appl. No. 12/868,838, filed Aug. 26, 2010 entitled "Content Bookmarking".
J. Bouwen et al., "Community Meets Entertainment: Community Television," Technology White Paper, Alcatel Telecommunications Review, 1st Quarter 2005, pp. 1-8, http://www.alcatel.com/doctypes/articlespaperlibrary/pdf/ATR2005QI/T0503-Community_TV-EN.pdf.
U.S. Office Action dated Apr. 28, 2009 in U.S. Appl. No. 11/787,733.
U.S. Office Action dated Jun. 22, 2009 in U.S. Appl. No. 11/787,732.
U.S. Final Office Action dated Dec. 30, 2009 in U.S. Appl. No. 11/787,732.
U.S. Office Action dated Sep. 14, 2010 in U.S. Appl. No. 11/651,140.
U.S. Office Action dated Sep. 14, 2010 in U.S. Appl. No. 11/787,732.
U.S. Office Action dated Sep. 30, 2010 in U.S. Appl. No. 12/126,165.
U.S. Office Action dated Oct. 5, 2010 in U.S. Appl. No. 12/126,096.
U.S. Final Office Action dated Dec. 22, 2010 in U.S. Appl. No. 11/651,140.

(56) References Cited

OTHER PUBLICATIONS

U.S. Final Office Action dated Jan. 14, 2011 in U.S. Appl. No. 12/126,096.
U.S. Final Office Action dated Feb. 26, 2013 in U.S. Appl. No. 11/651,140, 21 pgs.
U.S. Final Office Action dated Mar. 1, 2013 in U.S. Appl. No. 13/221,151, 15 pgs.
U.S. Final Office Action dated Mar. 27, 2013 in U.S. Appl. No. 12/126,096, 25 pgs.
U.S. Final Office Action dated Apr. 10, 2013 in U.S. Appl. No. 12/959,793, 23 pgs.
U.S. Office Action dated Apr. 11, 2013 in U.S. Appl. No. 12/959,731, 22 pgs.
U.S. Final Office Action dated Apr. 11, 2013 in U.S. Appl. No. 12/126,025, 28 pgs.
U.S. Final Office Action dated Apr. 25, 2013 in U.S. Appl. No. 12/126,165, 26 pgs.
U.S. Final Office Action dated Apr. 30, 2013 in U.S. Appl. No. 12/868,801, 13 pgs.
U.S. Final Office Action dated May 3, 2013 in U.S. Appl. No. 12/545,099, 20 pgs.
U.S. Office Action dated May 14, 2013 in U.S. Appl. No. 12/868,824, 12 pgs.
U.S. Office Action dated May 22, 2013 in U.S. Appl. No. 11/651,140, 20 pgs.
U.S. Office Action dated Jun. 20, 2013 in U.S. Appl. No. 12/126,126, 27 pgs.
U.S. Final Office Action dated Aug. 1, 2013 in U.S. Appl. No. 12/959,731, 23 pgs.
U.S. Office Action dated Aug. 16, 2013 in U.S. Appl. No. 12/868,801, 13 pgs.
U.S. Office Action dated Oct. 4, 2013 in U.S. Appl. No. 12/126,165, 28 pgs.
U.S. Office Action dated Oct. 7, 2013 in U.S. Appl. No. 12/959,793, 27 pgs.
U.S. Final Office Action dated Oct. 10, 2013 in U.S. Appl. No. 12/126,126, 23 pgs.
U.S. Final Office Action dated Oct. 28, 2013 in U.S. Appl. No. 11/651,140, 19 pgs.
U.S. Office Action dated Oct. 29, 2013 in U.S. Appl. No. 12/126,060, 27 pgs.
U.S. Final Office Action dated Nov. 1, 2013 in U.S. Appl. No. 12/868,824, 15 pgs.
U.S. Final Office Action dated Dec. 24, 2013 in U.S. Appl. No. 13/221,151, 17 pgs.
U.S. Final Office Action dated Jan. 9, 2014 in U.S. Appl. No. 12/126,096, 26 pgs.
U.S. Office Action dated Aug. 21, 2013 in U.S. Appl. No. 12/126,096, 23 pgs.
U.S. Office Action dated Sep. 9, 2013 in U.S. Appl. No. 13/221,151, 16 pgs.
U.S. Office Action dated Mar. 6, 2014 in U.S. Appl. No. 12/959,731, 16 pgs.
U.S. Office Action dated Mar. 18, 2014 in U.S. Appl. No. 11/651,140, 18 pgs.
U.S. Office Action dated Mar. 21, 2014 in U.S. Appl. No. 12/868,824, 12 pgs.
U.S. Final Office Action dated Apr. 3, 2014 cited in U.S. Appl. No. 12/126,060, 18 pgs.
U.S. Office Action dated May 20, 2014 cited in U.S. Appl. No. 12/126,096, 19 pgs.
U.S. Office Action dated May 21, 2014 cited in U.S. Appl. No. 13/221,151, 18 pgs.

* cited by examiner

CONTENT RECOMMENDATIONS

RELATED APPLICATIONS

Under provisions of 35 U.S.C. §119(e), Applicant claims the benefit of U.S. Provisional Application No. 61/266,670, filed Dec. 4, 2009, and which is also hereby incorporated by reference.

BACKGROUND

Service providers may deliver content (e.g. television programming) to a user over a content delivery system. The content available from the content delivery system is increasing. With the increase in the amount of content available, users may be overwhelmed and may need help identifying relevant content.

SUMMARY OF THE INVENTION

Content recommendations may be provided. First, in response to a received input and concurrent with a shrunken programming content, a media guide may be displayed. The media guide may comprise a first card, a second card, and a third card. The first card may comprise a plurality of recommendation types. The second card may comprise a plurality of subcategories corresponding to a selected one of the plurality of recommendation types. The third card may comprise a plurality of content program names corresponding to a selected one of the plurality of subcategories. Next, in response to a selection of a one of the plurality of content program names, an action card may be displayed. Then a selected one of the plurality of actions may be executed.

Both the foregoing general description and the following detailed description are examples and explanatory only, and should not be considered to restrict the invention's scope, as described and claimed. Further, features and/or variations may be provided in addition to those set forth herein. For example, embodiments of the invention may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
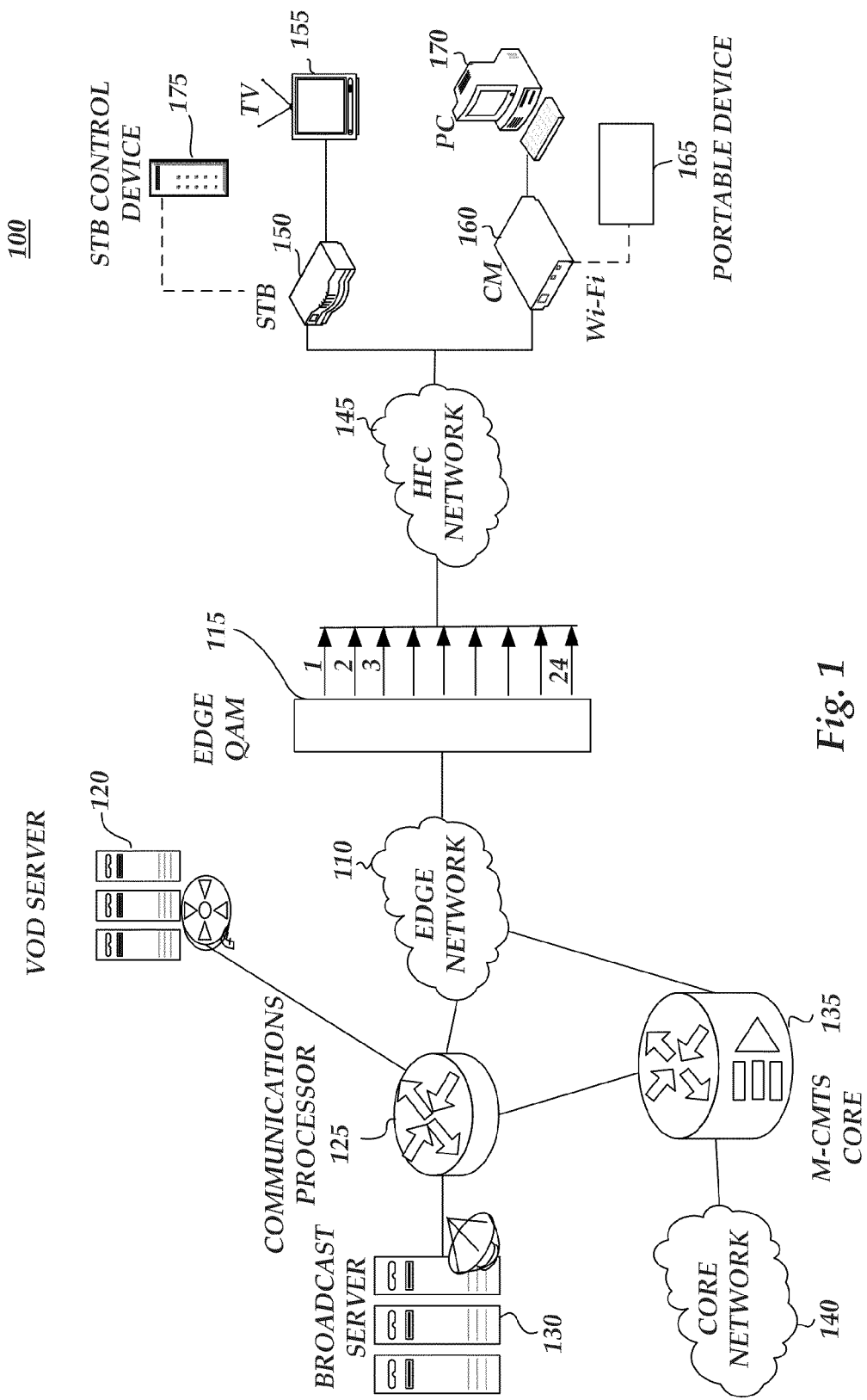
FIG. 1 is a block diagram of an operating environment including an application server.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

With the increase in the amount of television programming content available, users may be overwhelmed and may need help identifying relevant content. Embodiments of the present invention may provide content recommendations for television programming viewing. These content recommendations may provide users with control over their video watching experience while taking advantage of the services and features that may be most interesting and suitable to the user. Embodiments of the present invention may allow for better service to users by allowing service providers to learn more about a user and to use that knowledge to help users make viewing choices.

FIG. 1 is a block diagram of a content delivery system 100. Consistent with embodiments of the present invention, system 100 may comprise an edge network 110, an edge quadrature amplitude modulation (QAM) device 115, a video-on-demand (VOD) server 120, a list processor 125, a broadcast server 130, a modular cable modem termination system (M-CMTS) core 135, and a core network 140. In addition, system 100 may comprise, a hybrid fiber-coax (HFC) network 145, a set-top-box (STB) 150, a television (TV) 155, a cable modem (CM) 160, a portable device 165, a personal computer (PC) 170, and a STB control device 175. List processor 125 will be discussed in greater detail below with respect to FIG. 2.

Edge network 110 may comprise, a network providing, for example, full-duplex, two-way broadband services including broadband video and audio, cable television services, or telecommunications services. Edge network 110 may provide data by utilizing network data formats including, for example, i) Internet protocol (IP); ii) Ethernet; iii) digital subscriber line (DSL); iv) asynchronous transfer mode (ATM); and v) virtual private network (VPN). Edge network 110 may utilize managed network services. Edge network 110 may comprise various components including, for example, i) servers; ii) switches; iii) routers; iv) gateways; v) hubs; vi) fiber optic cable; vii) copper cable; and viii) terminations. The aforementioned are examples and edge network 110 may comprise other configurations for broadband service delivery and data switching over system 100.

Edge QAM 115 may provide modulation for various encoding formats (e.g. for data, audio, and video) and may distribute the signal down multiple broadband channels. Edge QAM 115 may modulate signals in, for example, multi-channel quadrature amplitude modulation. Edge QAM 115 may support broadcast and narrowcast with multi-program transport stream (MPTS) pass-through and single-program transport stream (SPTS) to MPTS multiplexing. Edge QAM 115 may meet data-over-cable service interface specification (DOCSIS) and downstream radio frequency interface (DRFI) performance specifications. Furthermore, edge QAM 115 may provide video over internet protocol and moving pictures expert group (MPEG) video simultaneously. Edge QAM 115 may provide various data switching functions and enable two-way, full-duplex communication within the broadband network. Edge QAM 115 may modulate and distribute broadcast multimedia services including, for example, i) a broadcast multi-media service; ii) a high-definition multimedia service; iii) a digital television multimedia service; iv) an analog multimedia service; v) a VOD service; vi) a streaming video service; vii) a multimedia messaging service; viii) a voice-over-internet protocol service (VoIP); ix) an interactive multimedia service; and x) an e-mail service. The aforementioned are examples and edge QAM 115 may comprise other configurations for different broadband and data services.

VOD server 120 may perform processes for providing video entertainment on demand. VOD server 120 may take MPEG compressed video off a hard disk or a networked service, format it into MPEG-TS packets inside a user datagram protocol (UDP) packet, and send it into edge network 110. Edge QAM 115 may receive the UDP packets, where Internet protocol (IP) encapsulation may be removed. The MPEG packets may be forwarded down one QAM channel on edge QAM 115 and onto HFC network 145.

Broadcast server 130 may perform processes for providing broadcast services. Broadcast server 130 may use a broadcast signal and a narrowcast signal to deliver broadcast services to a broadcast system. Broadcast server 130 may receive video, audio, and data from fiber optic input, wireless input, recorded tape, recorded digital video disc, or satellite input. Broadcast server 130 may utilize digital signal formats and analog signal formats. Furthermore, broadcast server 130 may comprise a specialized receiver and data switching equipment for broadband distribution. In addition, broadcast server 130 may provide broadband multimedia services including, for example, i) the broadcast multi-media service; ii) the high-definition multimedia service; iii) the digital television multimedia service; iv) the analog multimedia service; v) the VOD service; vi) the streaming video service; vii) the multimedia messaging service; viii) the voice-over-internet protocol service (VoIP); ix) the interactive multimedia service; and x) the e-mail service. The aforementioned are examples and broadcast server 130 may comprise other components and systems for providing broadcast services in system 100.

M-CMTS core 135 may receive IP datagrams from core network 140. M-CMTS core 135 may then forward these IP datagrams to either a single QAM channel within edge QAM 115 with traditional DOCSIS encapsulation, or may forward the IP datagrams to multiple QAM channels within edge QAM 115, for example, using DOCSIS bonding. M-CMTS core 135 may support DOCSIS features and end-to-end IP within a next generation network architecture (NGNA), for example.

Core network 140 may comprise any data or broadband network that may provide data and services to edge network 110, list processor 125, broadcast server 130, or M-CMTS core 135. For example, core network 140 may comprise the Internet. In addition, core network 140 may comprise various components including, for example, i) servers; ii) switches; iii) routers; iv) gateways; v) hubs; vi) fiber optic cable; vii) copper cable; and viii) terminations. The aforementioned are examples and core network 140 may comprise other components and may supply other services using various other formats.

HFC network 145 may comprise a communications network (e.g. a cable TV network) that uses optical fiber, coaxial cable, or an optical fiber coaxial cable combination. Fiber in HFC network 120 may provide a high-speed backbone for broadband services. Coaxial cable may connect end users in HFC network 120 to the backbone. Such networks may use, for example, matching DOCSIS cable modems at a head end and at an end user's premises. Such a configuration may provide bi-directional paths and Internet access.

STB 150 may comprise a single component or a multi-component system for receiving broadband services. STB 150 may comprise a service consumer system combining several components including, for example, a set top box, cable modem 160, a network interface unit, a residential gateway, a terminal unit, a scrambler/descrambler, a digital storage media unit, an input/output port, a display device, a keyboard, and a mouse. STB 150 may encode and decode digital and analog signals, and provide interface capability for other components. STB 150 may utilize various operating systems and other software components. The end user's premises may contain STB 150. STB 150 may include all the functionality provided by a cable modem, such as CM 160, in one component and attach to TV 155, for example.

TV 155 may comprise an end use device for displaying delivered broadband services. TV 155 may comprise, for example, a television, a high definition television (HDTV), a liquid crystal display unit (LCD), a video projection unit, or PC 170. The aforementioned are examples and TV 155 may comprise other display devices for delivered broadband services.

CM 160 may comprise, for example, a cable modem, a network server, a wireless fidelity data switch, or an Ethernet switch. CM 160 may provide data services to the user by accessing DOCSIS services from system 100. CM 160 may provide Internet access, video, or telephone services. The aforementioned are examples and CM 160 may comprise other data delivery devices.

Portable device 165 or PC 170 may comprise any personal computer, network switch, wireless switch, network hub, server, personal digital assistant, mobile telephone, mobile device, notebook computer, and home computing device. Portable device 165 or PC 170 may serve as user devices for data access from system 100. Portable device 165 and PC 170 may transmit and receive data and services from system 100.

STB control device 175 may comprise any input and output device for interfacing with STB 150 or TV 155. For example, STB control device 175 may be a remote control for using STB 150. STB control device 175, after proper programming, may interface with STB 150.

Embodiments consistent with the invention may comprise a system for providing content recommendations. The system may comprise a memory storage and a processing unit coupled to the memory storage. The processing unit may be operative to display, in response to a received second input and concurrent with a shrunken programming content, a media guide comprising. The media guide may comprise a first card, a second card, and a third card. The first card may comprise a plurality of recommendation types. The second card may comprise a plurality of subcategories corresponding to a selected one of the plurality of recommendation types. The third card may comprise a plurality of content program names corresponding to a selected one of the plurality of subcategories. In addition, the processing unit may be operative to display, in response to a selection of a one of the plurality of content program names from the third card, an action card in the media guide in place of the first card, the second card, or the third card. The action card may comprise a plurality of actions corresponding to the selected one of the plurality of content program names. Moreover, the processing unit may be operative to execute a selected one of the plurality of actions.

Consistent with embodiments of the present invention, the aforementioned memory, processing unit, and other components may be implemented in a content delivery system, such as system 100 of FIG. 1. Any suitable combination of hardware, software, and/or firmware may be used to implement the memory, processing unit, or other components. By way of example, the memory, processing unit, or other components may be implemented with STB 150, TV 155, CM 160, PC 170, portable device 165, or list processor 125, in combination with system 100. The aforementioned system and processors are examples and other systems and processors may comprise the aforementioned memory, processing unit, or other components, consistent with embodiments of the present invention.

Figure 2:
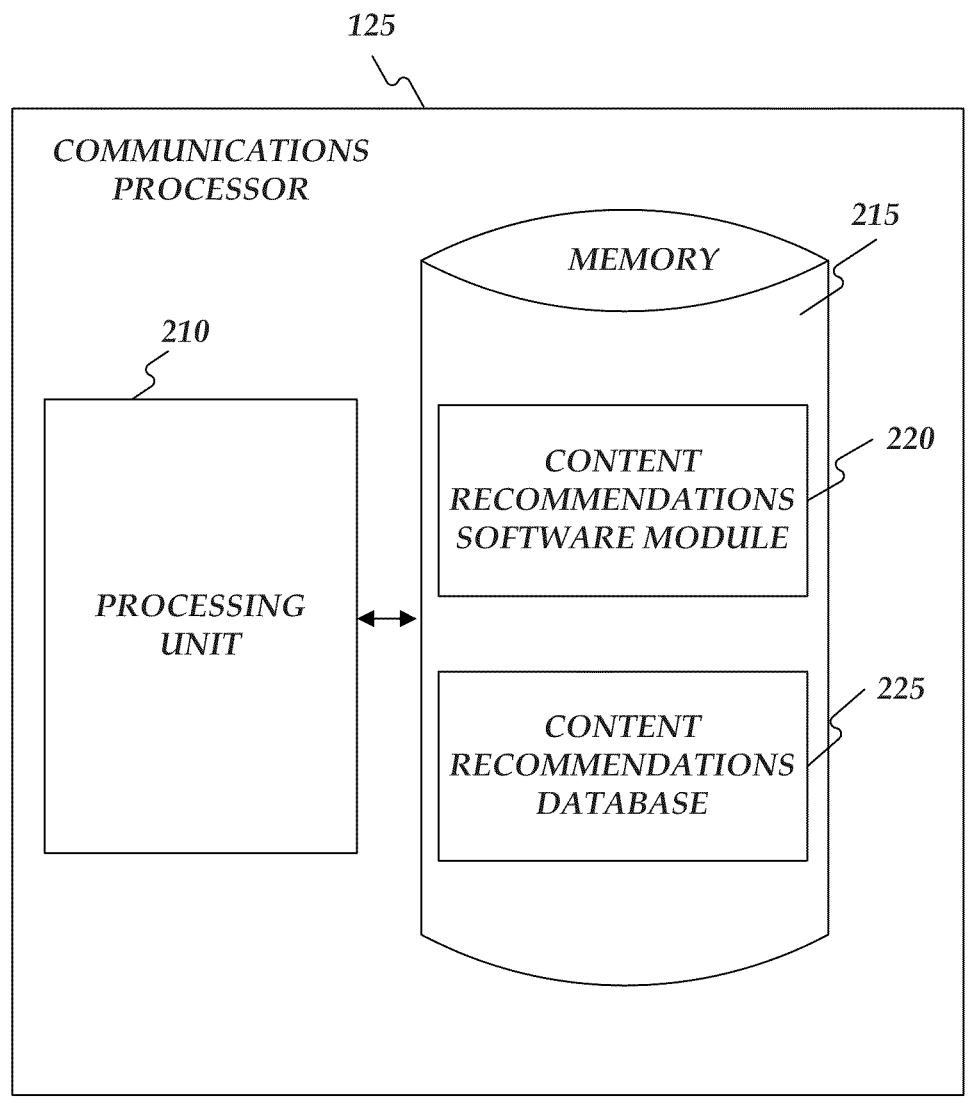
FIG. 2 is a block diagram of the communications processor.

FIG. 2 shows communications processor 125 of FIG. 1 in more detail. As shown in FIG. 2, communications processor 125 may include a processing unit 210 and a memory unit 215. Memory 215 may include a content recommendations software module 220 and a content recommendations database 225. While executing on processing unit 210, content recommendations software module 220 may perform processes for providing content recommendations, including, for example, one or more stages included in method 300 described below with respect to FIG. 3. Furthermore, content recommendations software module 220 and content recommendations database 225 may be executed on or reside in any element shown in FIG. 1. Moreover, any one or more of the stages included in method 300 may be performed on any element shown in FIG. 1 including, but not limited to, STB 150, TV 155, CM 160, PC 170, or portable device 165.

Communications processor 125 ("the processor") may be implemented using a personal computer, a network computer, a mainframe, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

Figure 3:
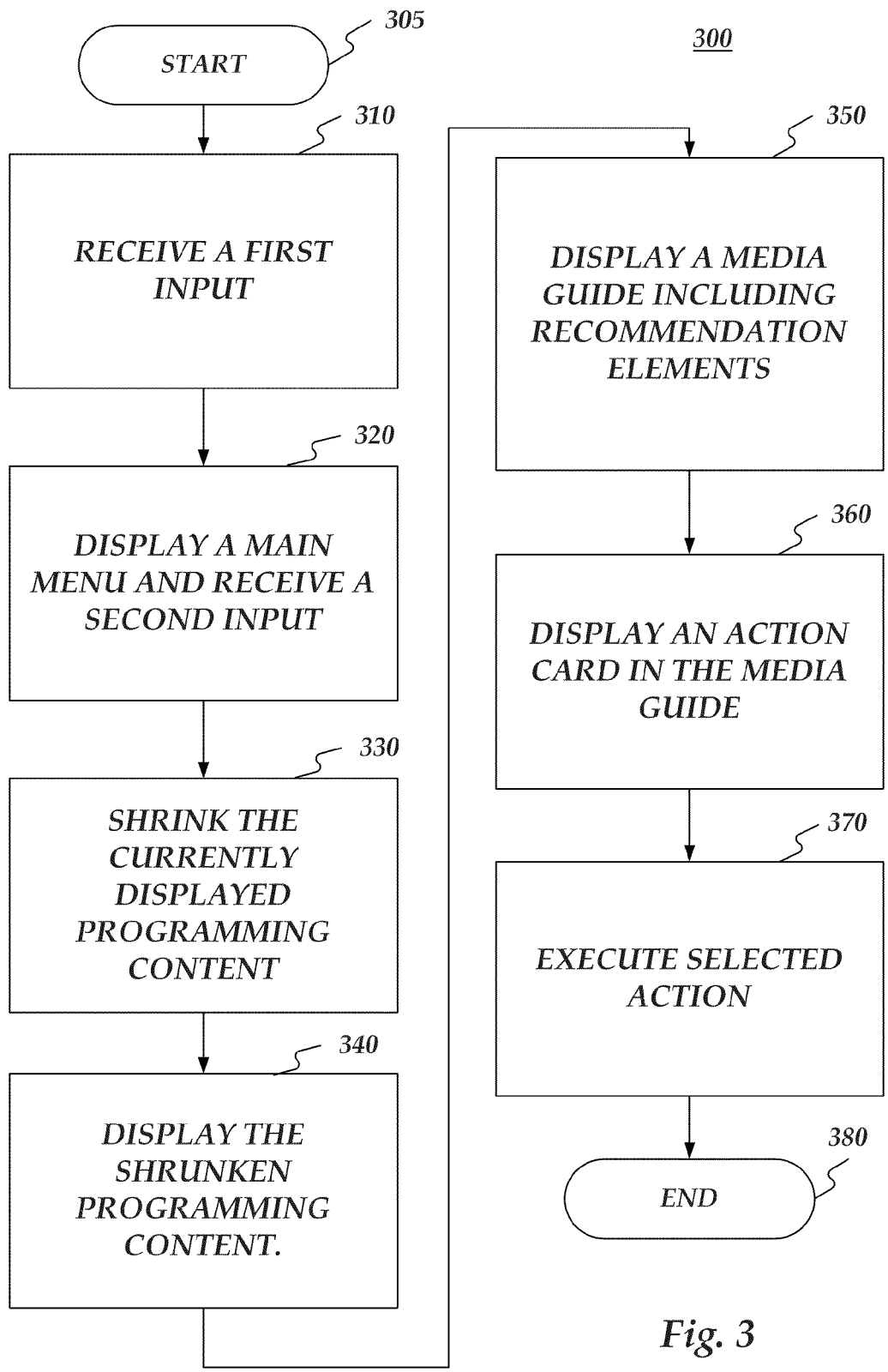
FIG. 3 is a flow chart of a method for providing content recommendations.

FIG. 3 is a flow chart setting forth the general stages involved in a method 300 consistent with an embodiment of the invention for providing content recommendations. Method 300 may be implemented using communications processor 125 as described in more detail above with respect to FIG. 2. Ways to implement the stages of method 300 will be described in greater detail below. While the media guide described below with respect to method 300 may be described as being displayed on TV 155, embodiments consistent with the invention are not so limited. For example, a media guide consistent with embodiments of the invention may be displayed on any platform including, but not limited to, a web based application (e.g. PC 170) or a mobile device (e.g. portable device 165.)

Figure 4:
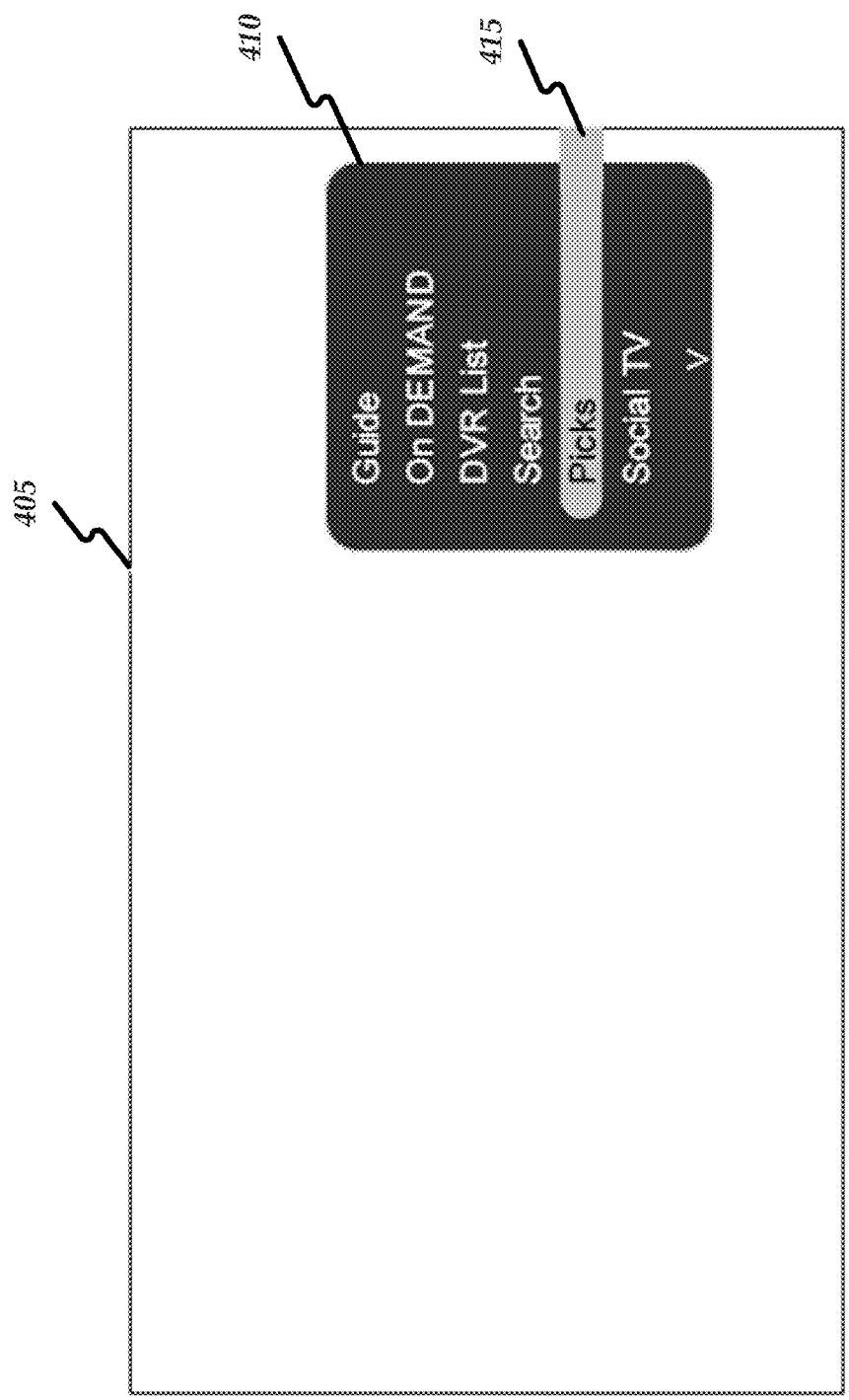
FIG. 4 is a diagram illustrating a main menu.

Method 300 may begin at starting block 305 and proceed to stage 310 where communications processor 125 may receive a first input. For example, as shown in FIG. 4, a user may be viewing a programming content 405 on TV 155. While viewing programming content 405, the user may desire to use a media guide. Accordingly, the user may press a button on control device 175 associated with the media guide. Once the button is pressed, control device 175 may send the first input to STB 150 that may then send the first input to communications processor 125.

From stage 310, where communications processor 125 receives the first input, method 300 may advance to stage 320 where, in response to the first input, communications processor 125 may place a main menu 410 on programming content 405 on TV 155. The user may then select, using control device 175, a "picks" element 415 (e.g. a content recommendations element) from main menu 410 associated with the media guide. Picks element 415 may correspond to a content recommendations functionality of the media guide. In response to the user selecting picks element 415, STB 150 may send a second input to communications processor 125. The aforementioned are examples, and the user may view programming content 405 on any device including, but not limited to, portable device 165 and PC 170.

Figure 5:
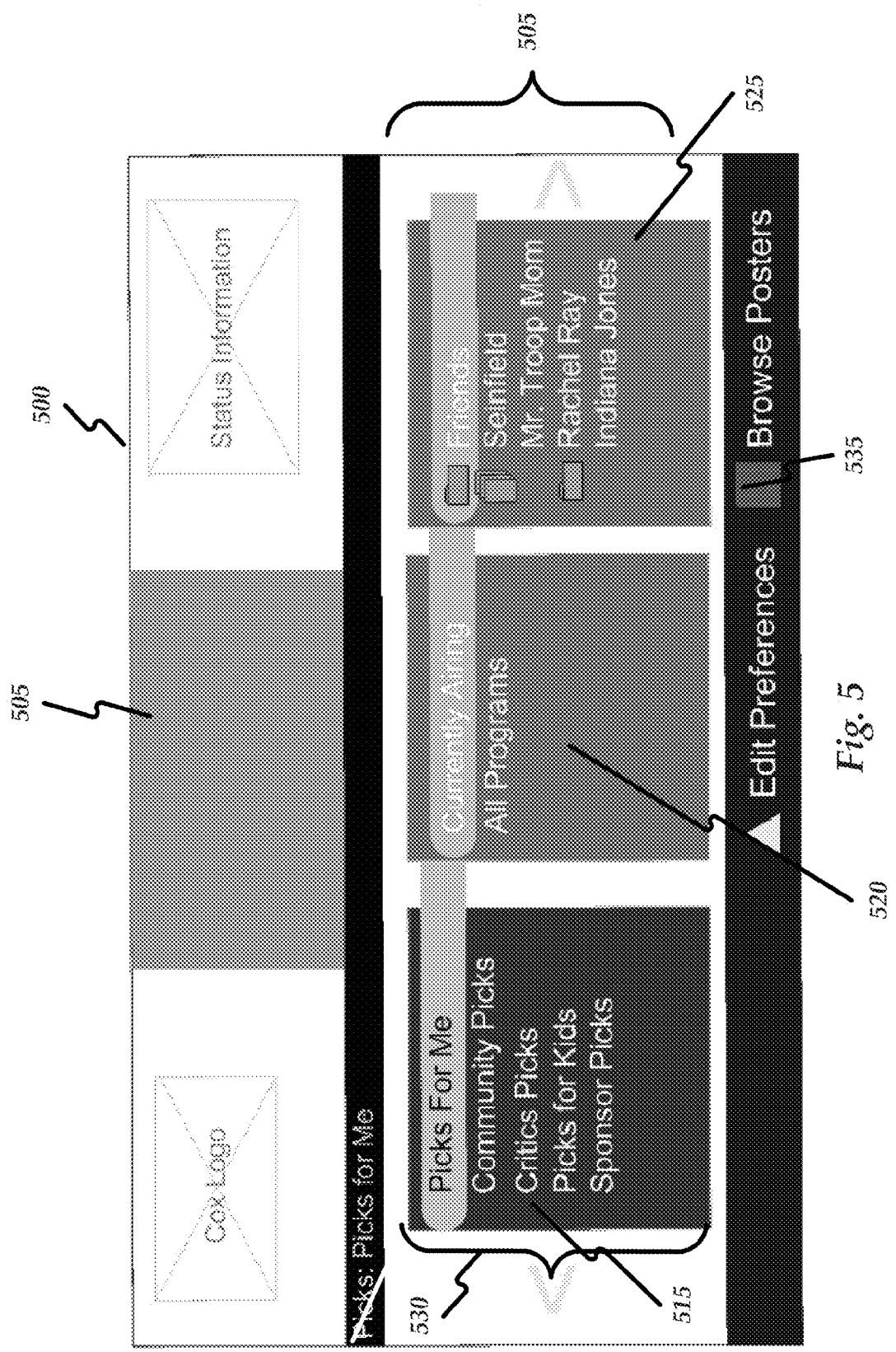
FIG. 5 is a diagram illustrating a media guide.

From stage 320, where communications processor 125 receives the second input, method 300 may advance to stage 330 where communications processor 125 may shrink currently displayed programming content 405. Once communications processor 125 shrinks currently displayed programming content 405 in stage 330, method 300 may continue to stage 340 where communications processor 125 may display a shrunken programming content 505 (i.e. scaled video) as shown in FIG. 5. For example, in response to the second input, communications processor 125 may display on TV 155 shrunken programming content 505. Shrunken programming content 505, for example, may comprise a shrunken version of programming content 405. Furthermore, shrunken programming content 505 may correspond to the currently selected program when the guide is first invoked (i.e., the guide comes up on time, on channel).

After communications processor 125 displays shrunken programming content 505 in stage 340, method 300 may proceed to stage 350 where communications processor 125 may display, in response to the received second input and concurrent with shrunken programming content 505, a media guide 510 as shown in FIG. 5 including recommendation elements. Shrunken programming content 505 and media guide 510 may be displayed in combination as display 500. Display 500, for example, may be configured to fit at least the width of a high-definition television (HDTV) display. Media guide 510 may comprise at least three recommendation elements, for example, a first card 515, a second card 520, and a third card 525. While FIG. 5 shows three recommendation elements, more or less than three may be used.

First card 515 in FIG. 5 shows an example of a recommendation card. The recommendation card may be configured to display a plurality of recommendation types 530 that can be taken with respect to content recommendations. For any one of the plurality of recommendation types 530 selected from the recommendation card displayed in first card 515, recommendation subcategories corresponding to the selected one of the plurality of recommendation types 530 may be displayed in second card 520. For any one of the plurality of subcategories selected from second card 520, a corresponding plurality of content program names may be displayed in third card 525. The plurality of content program names displayed in third card 525 may be listed, for example, in order by relevancy, order by rating provided by users, viewership data (e.g. most watched program first and least watched at the bottom), chronological, alphabetical, or vendor specified. As an alternative, no subcategories for any one or more of the plurality of recommendation types 530 may be displayed in second card 520. In this alternative, for any one of the plurality of recommendation types 530 selected, a corresponding plurality of content program names may be directly displayed in second card 520 or in third card 525 without any intervening subcategories.

Figure 6:
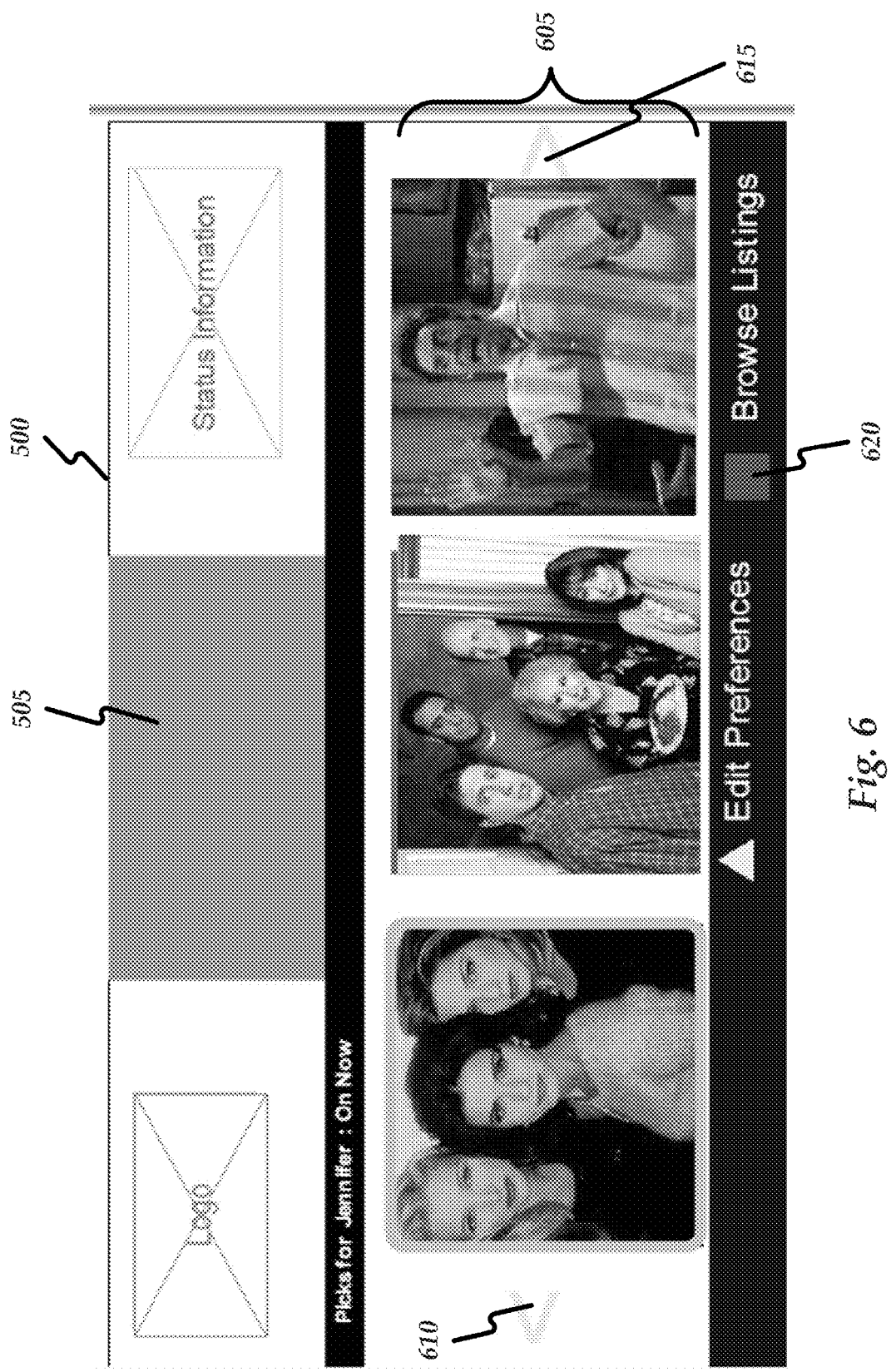
FIG. 6 is a diagram illustrating a media guide.

As shown in FIG. 5, display 500 may also include a "browse posters" button 535. When browse posters button 535 is selected, a "poster view" 605 may be displayed as shown in FIG. 6. Poster view 605 may display posters respectively corresponding to the aforementioned content program names. By selecting a forward button 610 or a backward button 615, the posters respectively corresponding to the aforementioned content program names may be shuffled through. By selecting a browse listing button 620, display 500 as shown in FIG. 5 may be toggled back to.

As an alternative in a video view, the posters may instead comprise videos so that users can view trailers, previews, and short video clips when selected. For example, instead of browse posters button 535, a browse videos button may be displayed. When the user selects the browse videos button, videos may be displayed in the three cards (i.e. first card 515, second card 520, and third card 525) respectively corresponding to the aforementioned content program names. In some instances the user may be given an option to play the video by pressing a "play" button. The audio may be from whichever card is highlighted. For example, if the program corresponding to the aforementioned content program names is linear and currently airing, the currently airing program may be displayed in one of the cards without the user having to press a play button. If the program corresponding to the aforementioned content program names happens to be on On Demand or on DVR, a still picture may be displayed in one of the cards (e.g. could be posters, could be one of the frames of the video). By pressing a play button that may be superimposed, for example, on the still picture, the On Demand or DVR video may start.

As stated above, first card 515 may be configured to display plurality of recommendation types 530 that can be taken with respect to content recommendations. As shown in FIG. 5, plurality of recommendation types 530 may comprise, but are not limited to, "picks for me," "community picks," "critics picks," "picks for kids," and "sponsor picks."

Figure 7:
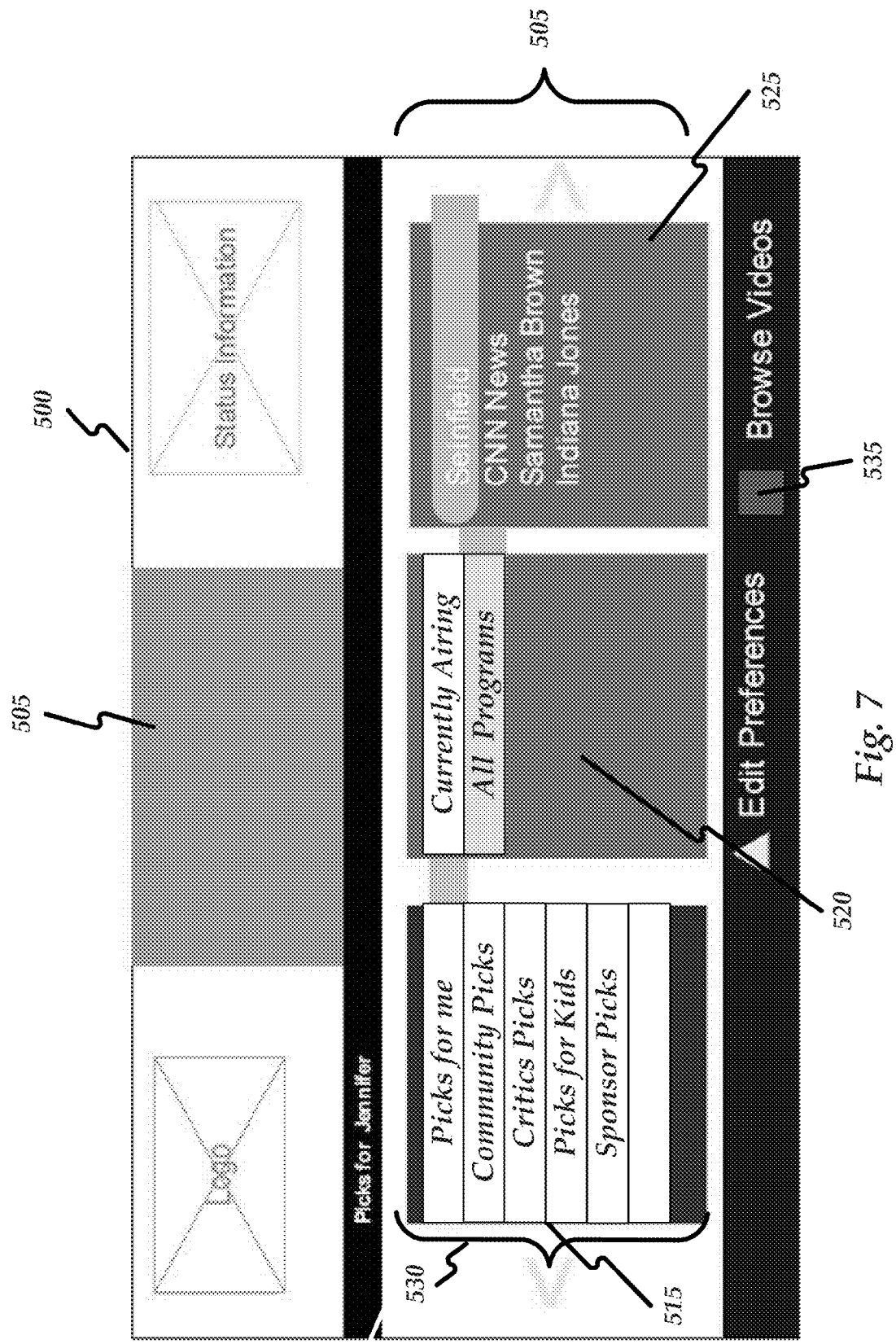
FIG. 7 is a diagram illustrating a media guide.

When the "picks for me" recommendation type is selected, the plurality of subcategories in second card 520 may comprise, but not limited to, "currently airing" and "all programs." When "currently airing" is selected from second card 520, a plurality of content program names corresponding to recommended linear programs currently airing may be displayed in third card 525. When "all programs" is selected from second card 520, a plurality of content program names corresponding to all recommended programs may be displayed in third card 525 as shown in FIG. 7.

Regardless of subcategory, when the "picks for me" action is selected, third card 525 (or alternatively second card 520) may include a plurality of content program names corresponding to programs that are being recommended to the user. These programs may be recommended based upon information the service provider knows about the user (e.g. the user's viewing habits) and/or information provided by the user. A recommendation engine may analyze this information and output a plurality of content program names to recommend to the user. The plurality of content program names may be listed by degree of relevance. In other words, the plurality of content program names may be listed with the most highly recommended program first and the least highly recommended program last. Moreover, they may be displayed based on personalized recommendation engine algorithms where only a subset of these programs may be displayed that are targeted to the user. Consistent with embodiments of the invention, the user may be given the option to reset the recommendation process in order to cause the recommendation engine to re-analyze with fresh information corresponding to the user.

Figure 8:
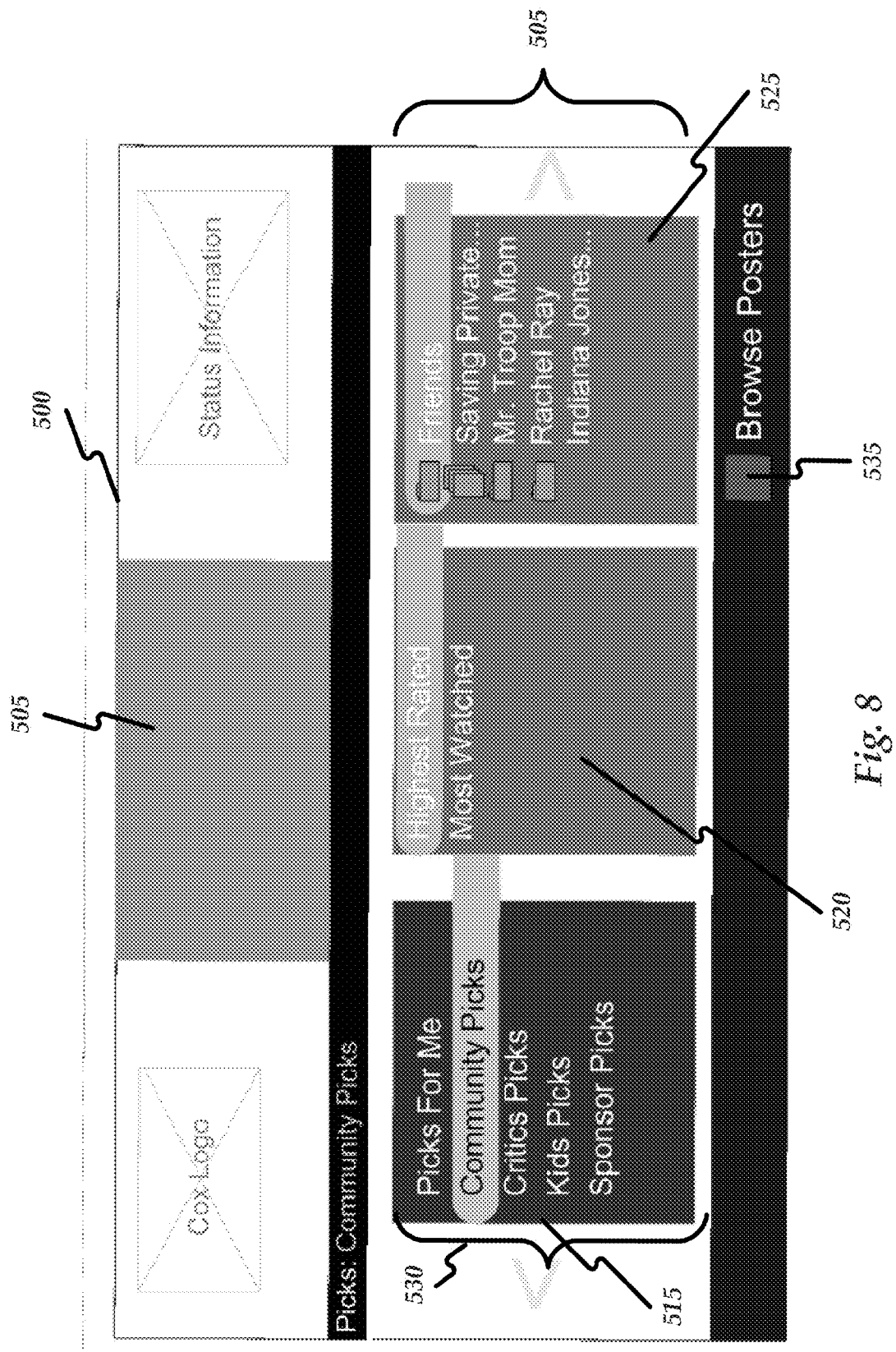
FIG. 8 is a diagram illustrating an action card.

As shown in FIG. 8, when the "community picks" recommendation type is selected, the plurality of subcategories in second card 520 may comprise, subcategories corresponding to community picks comprising "highest rated" and "most watched". When the "highest rated" subcategory is selected, third card 525 may include a plurality of content program names corresponding to programs receiving the highest rating. For example, the service provider may provide a process for users to rate various content programs. The users may comprise users within a particular market or any other type of category. The ratings for each genre given by the users may be compiled and reflected in the plurality of content program names in third card 525. The plurality of content program names may be listed by degree of relevance (e.g. order by rating provided by users.) In other words, the plurality of content program names may be listed with the highest rated program first and the least rated program last. Moreover, they may be displayed based on personalized recommendation engine algorithms where only a subset of these programs may be displayed that are targeted to the user.

When the "most watched" subcategory is selected from second card 520, third card 525 may include a plurality of content program names corresponding to programs having been watched the most. For example, the service provider may employ a process for determining which content programs are watched the most frequently. The users may comprise users within a particular market or any other type of category. The content watching frequency for each genre may be compiled by the service provider and reflected in the plurality of content program names in third card 525. The plurality of content program names may be listed by degree of relevance (e.g. using viewership data, most watched program first and least watched at the bottom.) In other words, the plurality of content program names may be listed with the highest content watching frequency program first and the least content watching frequency program last. Moreover, they may be displayed based on personalized recommendation engine algorithms where only a subset of these programs may be displayed that are targeted to the user.

Notwithstanding, programs within the subcategories may be further segregated by genre. The various content genres may comprise, but are not limited to, "action," "reality," "sports," "children's programming," "comedy," "drama," etc. When any of the various content genres is selected from second card 520, a plurality of content program names corresponding to the selected genre may be displayed in third card 525.

Figure 9:
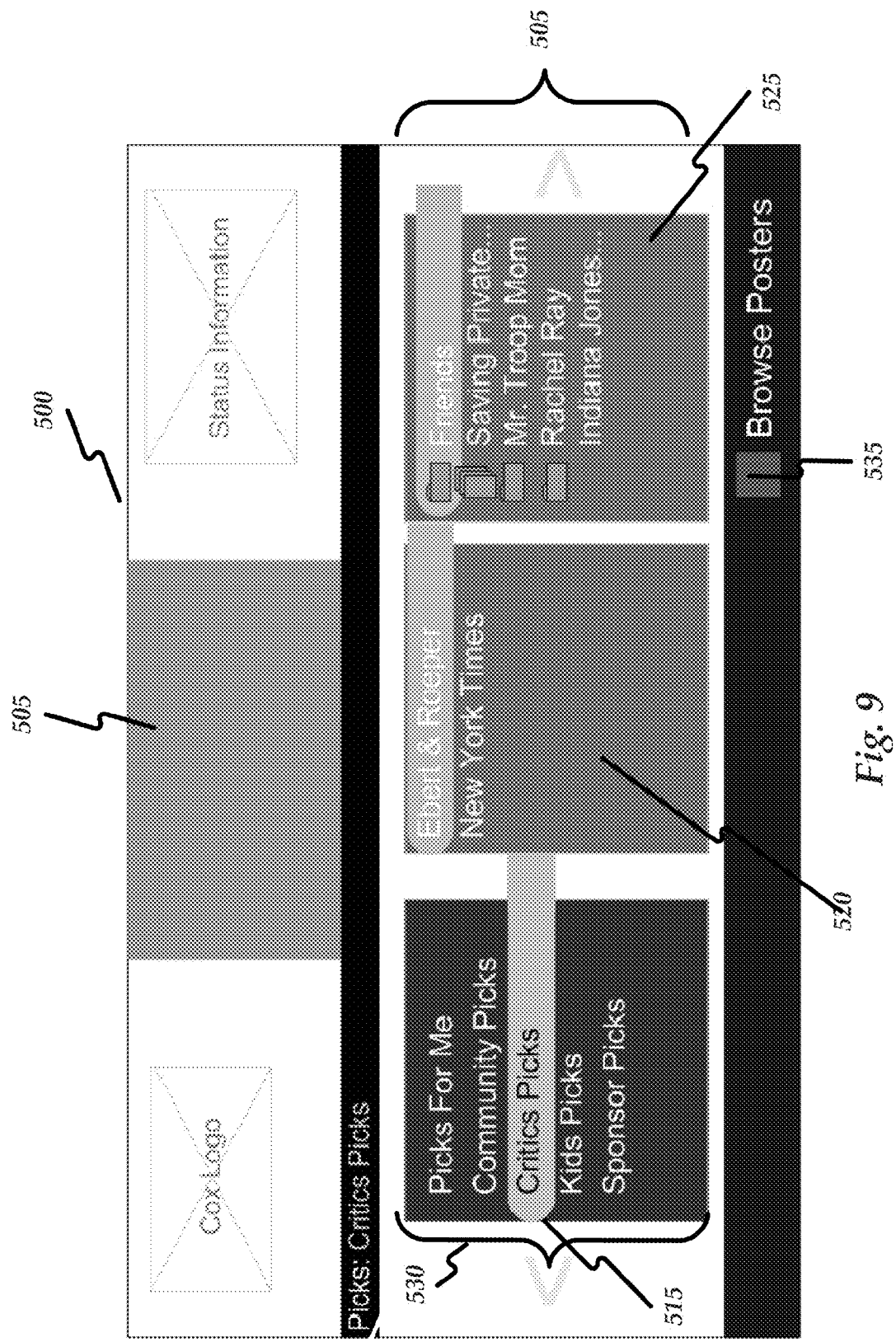
FIG. 9 is a diagram illustrating a media guide.

As shown in FIG. 9, when the "critic's picks" recommendation type is selected, the plurality of subcategories in second card 520 may comprise, but not limited to, various content critics or enterprises that perform critical analysis of content programs. When any of the various subcategories is selected from second card 520, a plurality of content program names corresponding to the selected subcategory may be displayed in third card 525.

Regardless of the corresponding subcategory, when the "critics picks" action is selected, third card 525 (or alternatively second card 520) may include a plurality of content program names corresponding to programs recommended by the content critic or the enterprise that may performs critical analysis selected from second card 520. The plurality of content program names may be listed by degree of relevance. In other words, the plurality of content program names may be listed with the most highly recommended by the critic first and the least most highly recommended by the critic last. For example, critics picks may be in any of the three orders: chronological, alphabetical, or in an order vendor specifies. Moreover, they may be displayed based on personalized recommendation engine algorithms where only a subset of these programs may be displayed that are targeted to the user.

Figure 10:
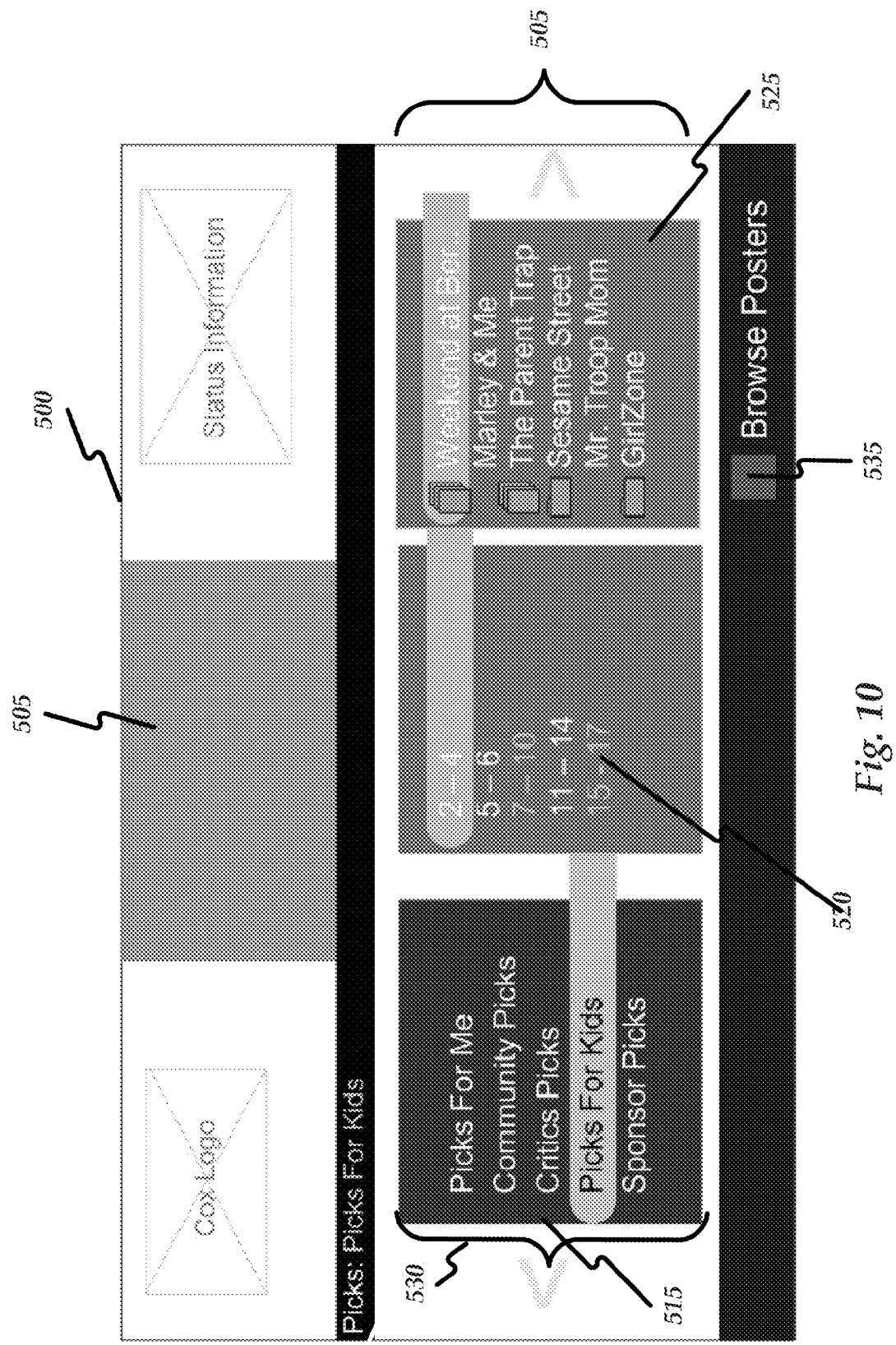
FIG. 10 is a diagram illustrating a media guide.

As shown in FIG. 10, when the "picks for kids" recommendation type is selected, the plurality of subcategories in second card 520 may comprise, but not limited to, various age ranges for children or various enterprises that may perform content rating for children's programs (e.g. Common Sense Media of 650 Townsend, Suite 375 San Francisco, Calif. 94103.) For example, the subcategories may comprise, but not limited to, "ages 2 through 4," "ages 5 through 6," "ages 7 through 10," etc. Moreover, the subcategories may comprise names of enterprises that may perform content rating for children's programs. When any of the various subcategories is selected from second card 520, a plurality of content program names corresponding to the selected subcategory may be displayed in third card 525.

Regardless of the corresponding subcategory, when the "picks for kids" action is selected, third card 525 (or alternatively second card 520) may include a plurality of content program names corresponding to programs recommended by the enterprise that may perform content rating for children's programs selected from second card 520. The plurality of content program names may be listed by degree of relevance. In other words, the plurality of content program names may be listed with the most highly recommended by the enterprise first and the least most highly recommended by the enterprise last. For example, picks for kids may be in any of the three orders: chronological, alphabetical, or in an order vendor specifies. Moreover, they may be displayed based on personalized recommendation engine algorithms where only a subset of these programs may be displayed that are targeted to the user. Alternatively, the plurality of content program names may be listed alphabetically for recommended age ranges selected in the various subcategories of second card 520.

Figure 11:
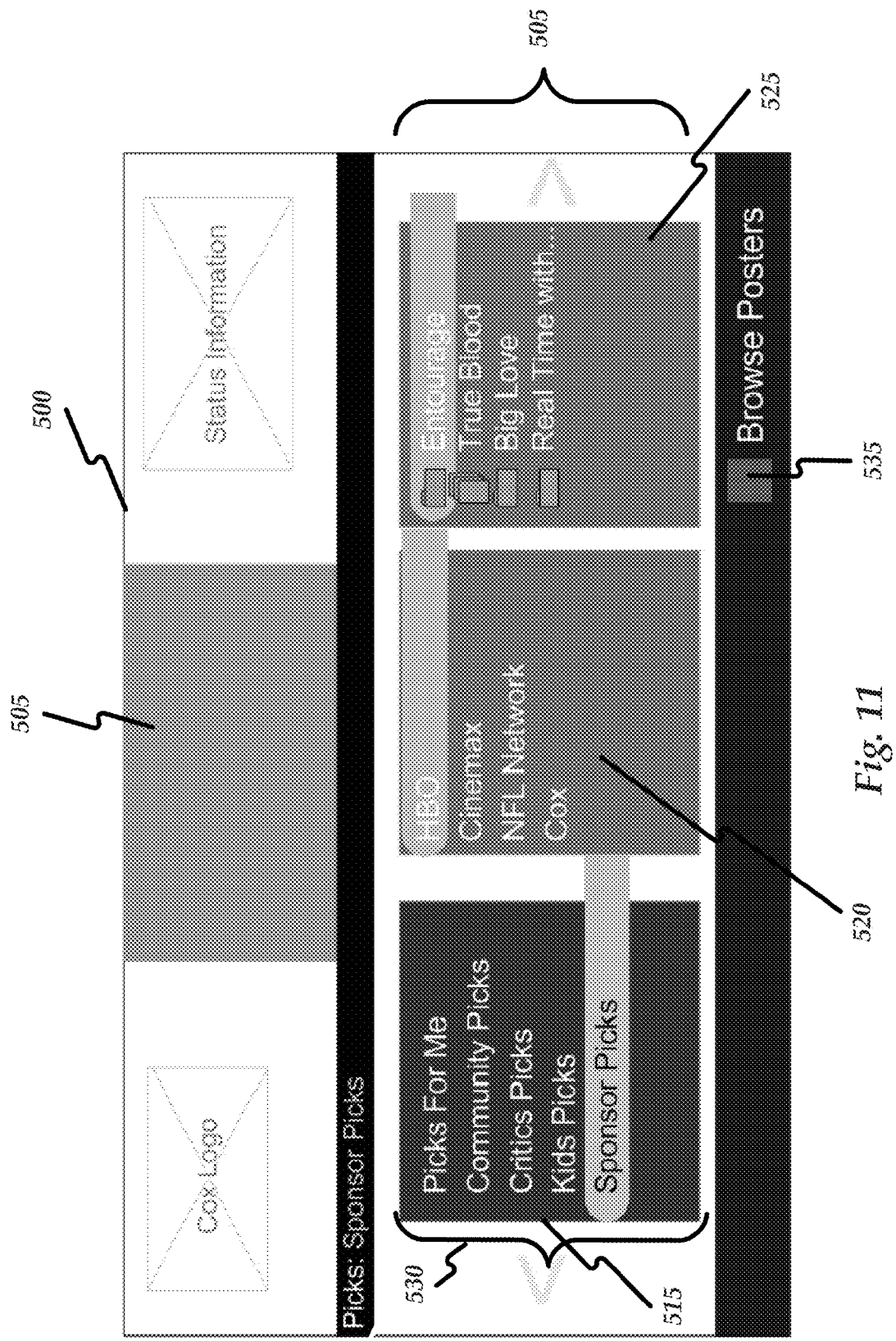
FIG. 11 is a diagram illustrating a media guide.

As shown in FIG. 11, when the "sponsor picks" recommendation type is selected, the plurality of subcategories in second card 520 may comprise, but not limited to, various enterprises that sponsor, sales, or produces content programs. For example, the various enterprises may comprise, but are not limited to, a service provider, a television network, a video on demand provider, etc. When any of the various subcategories is selected from second card 520, a plurality of content program names corresponding to the selected subcategory may be displayed in third card 525.

Regardless of the corresponding subcategory, when the "sponsor picks" action is selected, third card 525 (or alternatively second card 520) may include a plurality of content program names corresponding to programs recommended by the enterprises that sponsor, sales, or produces content programs selected from second card 520. The plurality of content program names may be listed by degree of relevance. In other words, the plurality of content program names may be listed with the most highly recommended by the enterprise first and the least most highly recommended by the enterprise last. For example, sponsor picks may be in any of the three orders: chronological, alphabetical, or in an order vendor specifies. Moreover, they may be displayed based on personalized recommendation engine algorithms where only a subset of these programs may be displayed that are targeted to the user.

Figure 12:
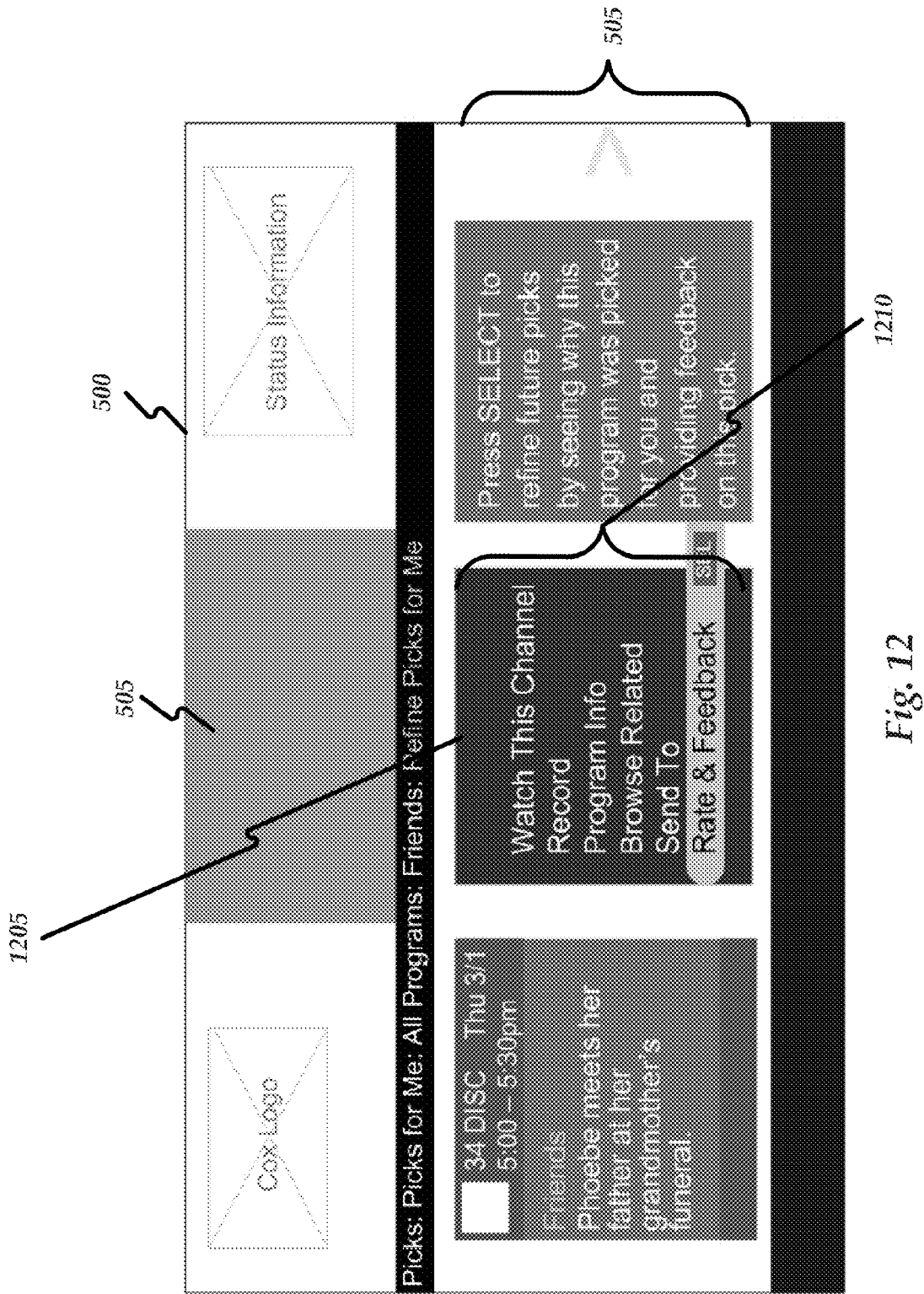
FIG. 12 is a diagram illustrating a media guide.
Figure 13:
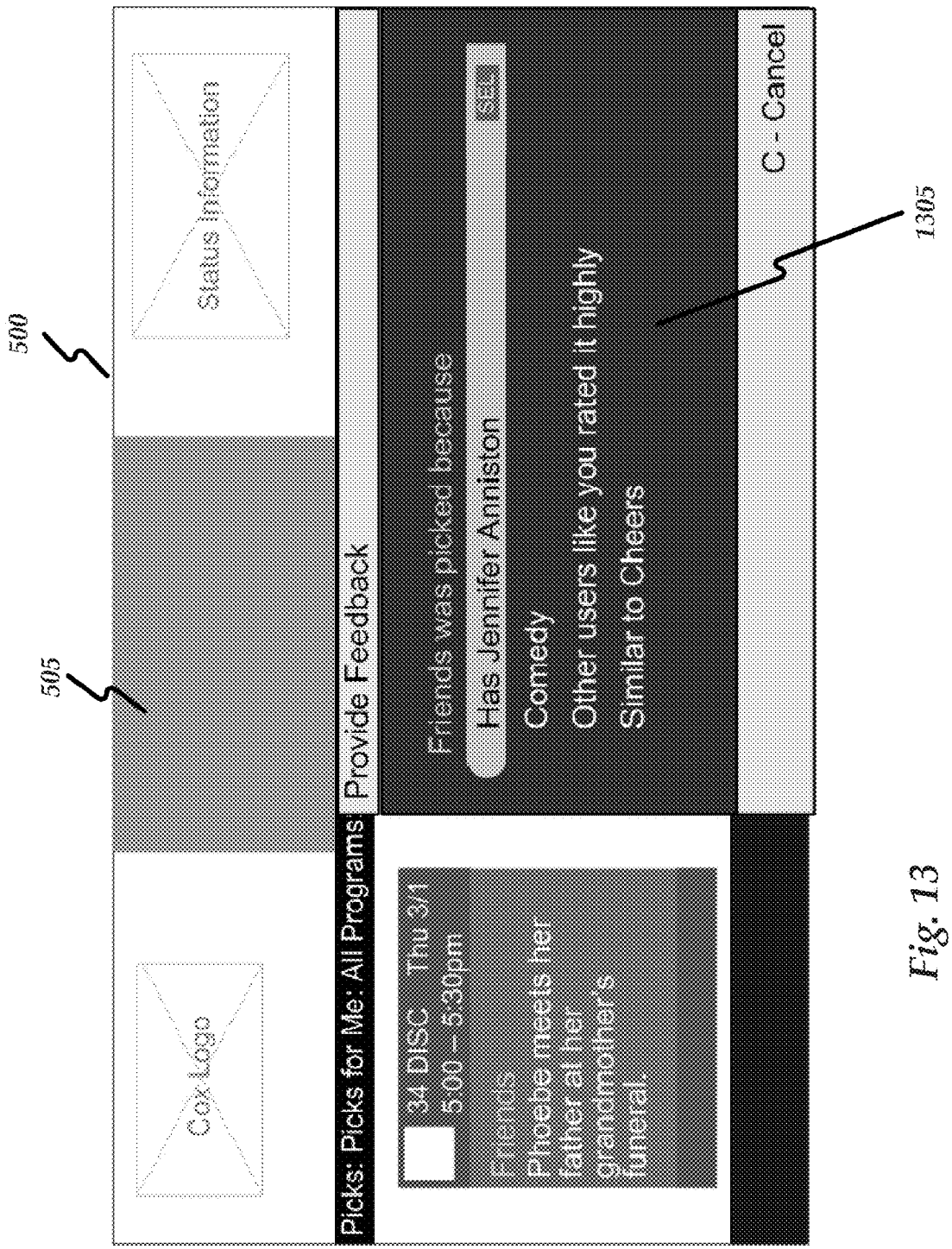
FIG. 13 is a diagram illustrating a media guide.

After communications processor 125 displays media guide 510 in stage 350, method 300 may proceed to stage 360 where communications processor 125 may display, in response to a received selection of one of the plurality of content programs, an action card 1205 in media guide 505 as shown in FIG. 12. As reference above, the one of the plurality of content programs may be selected from third card 525 as shown in FIG. 5 or from poster view 605 as shown in FIG. 6. The action card may be configured to display a plurality of actions 1210 that can be taken with respect to the received selection of the one of the plurality of content programs from third card 525 (or with respect to a received selection of the poster from poster view 605 from FIG. 6.)

Plurality of actions 1210 displayed in action card 1205 may be a function of the type of program the program name selected from third card 525 is. For example, if the program name selected from third card 525 is a linear program, the plurality of actions 810 may comprise, put are not limited to, "watch now," "record," "program info," "browse related," "rate & feedback," "set reminder," "send to." If "watch now" is selected, the program corresponding to the program name selected from third card 525 may be displayed on TV 155. If "record" is selected, the program corresponding to the program name selected from third card 525 may be recorded by communications processor 125. If "program info" is selected, information corresponding to the program name selected from third card 525 may be displayed on TV 155. If "browse related" is selected, the user may be given the option to browse for other programming related to the program name selected from third card 525. If "rate & feedback" is selected, the user may be given the option to provide a rating or provide feedback for the program corresponding to the program name selected from third card 525. If "set reminder" is selected, the user may be given the option to set a reminder to watch the program corresponding to the program name selected from third card 525. If "send to" is selected, the user may be given the option to send information for social networking regarding the program corresponding to the program name selected from third card 525.

In addition, if the program name selected from third card 525 is an on demand program, the plurality of actions 1210 may comprise, put are not limited to, "watch now," "buy now," "resume," "watch from beginning," "program info," "browse related," "rate & feedback," "set reminder," "send to." If "watch now" is selected, the program corresponding to the program name selected from third card 525 may be displayed on TV 155. If "buy now" is selected, user may be given the option to purchase an on-demand program corresponding to the program name selected from third card 525. If "resume" is selected, the program corresponding to the program name selected from third card 525 may be displayed on TV 155 from a point where it was paused the last time the user watched the program. If "watch from beginning" is selected, the program corresponding to the program name selected from third card 525 may be displayed on TV 155 from the beginning regardless of whether the program had been paused the last time the user watched the program. If "program info" is selected, information corresponding to the program name selected from third card 525 may be displayed on TV 155. If "browse related" is selected, the user may be given the option to browse for other programming related to the program name selected from third card 525. If "rate & feedback" is selected, the user may be given the option to provide a rating or provide feedback for the program corresponding to the program name selected from third card 525. If "set reminder" is selected, the user may be given the option to set a reminder to watch the program corresponding to the program name selected from third card 525. If "send to" is selected, the user may be given the option to send information for social networking regarding the program corresponding to the program name selected from third card 525.

Furthermore, if the program name selected from third card 525 is from the users own digital video recorder (DVR), the plurality of actions 1210 may comprise, put are not limited to, "watch now," "keep until," "delete this program," "resume," "watch from beginning," "program info," "browse related," "rate & feedback," "set reminder," "send to." If "watch now" is selected, the program corresponding to the program name selected from third card 525 may be displayed on TV 155. If "keep until" is selected, user may be given the option to set a time after which communications processor 125 may delete, from the user's DVR, a program corresponding to the program name selected from third card 525. If "delete this program" is selected, communications processor 125 may delete, from the user's DVR, a program corresponding to the program name selected from third card 525. If "resume" is selected, the program corresponding to the program name selected from third card 525 may be displayed on TV 155 from a point where it was paused the last time the user watched the program. If "watch from beginning" is selected, the program corresponding to the program name selected from third card 525 may be displayed on TV 155 from the beginning regardless of whether the program had been paused the last time the user watched the program. If "program info" is selected, information corresponding to the program name selected from third card 525 may be displayed on TV 155. If "browse related" is selected, the user may be given the option to browse for other programming related to the program name selected from third card 525. If "rate & feedback" is selected, the user may be given the option to provide a rating or provide feedback for the program corresponding to the program name selected from third card 525. If "set reminder" is selected, the user may be given the option to set a reminder to watch the program corresponding to the program name selected from third card 525. If "send to" is selected, the user may be given the option to send information for social networking regarding the program corresponding to the program name selected from third card 525.

Furthermore, plurality of actions 1210 may be displayed in action card 1205 by degree of relevance. For example, if the program had been paused the last time the user watched the program, "resume" may be included in plurality of actions 1210 and may be move higher up in plurality of actions 1210. "Buy now" may be placed high in plurality of actions 810 for on-demand programming. Less used actions like "send to" may be placed low in plurality of actions 1210. Notwithstanding, which action are included in and where they are placed in plurality of actions 1210 may be a function of the type of program the selected program is and how relevant the action is to this type of program.

From stage 360, where communications processor 125 displays action card 805, method 300 may advance to stage 370 where communications processor 125 may execute the selected one of plurality of actions 1210 from action card 1205 corresponding to one of the plurality of content programs from third card 525. Once communications processor 125 executes the selected one of plurality of actions 1210 in stage 370, method 300 may then end at stage 380.

Figure 14:
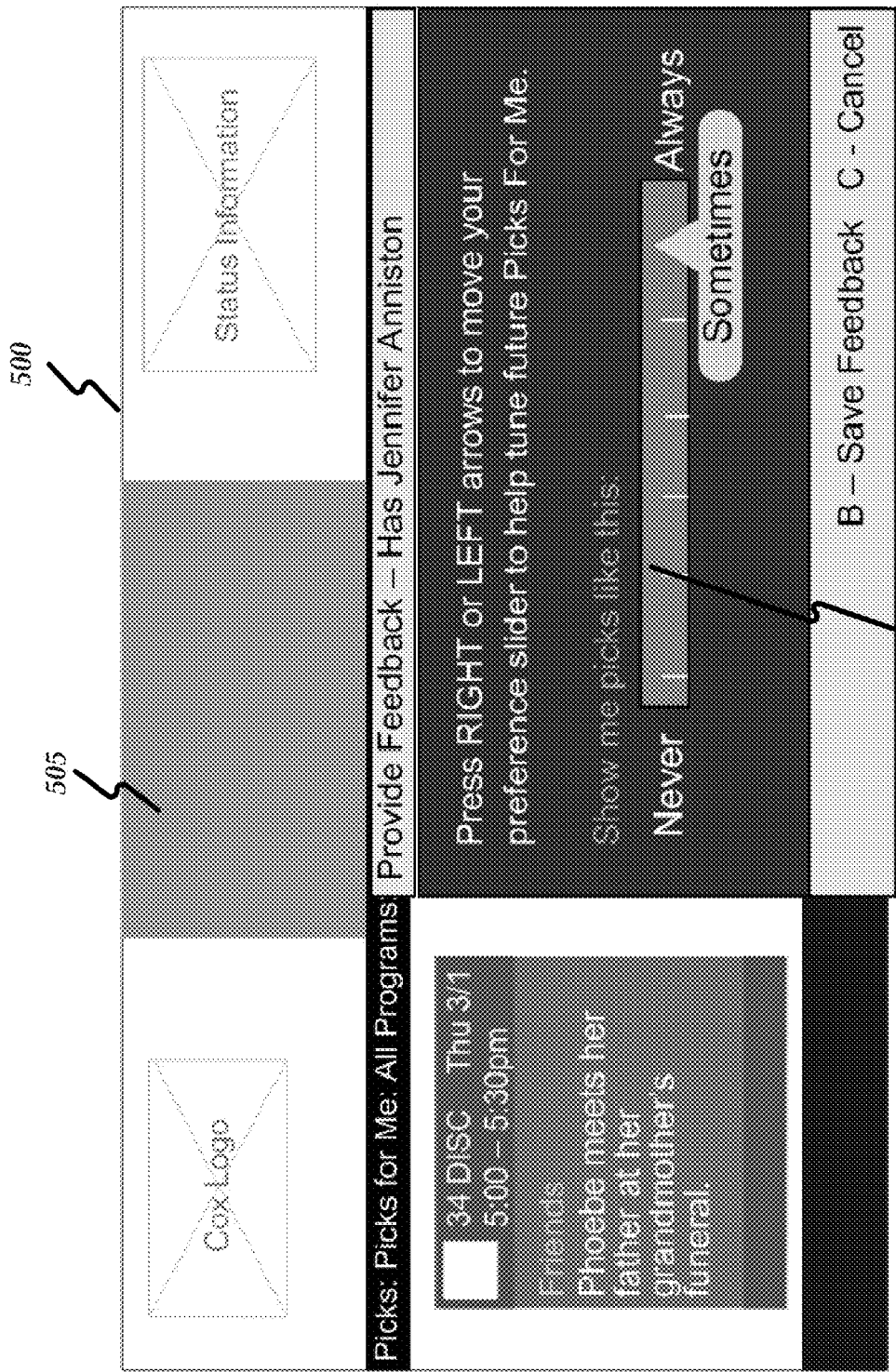
FIG. 14 is a diagram illustrating a media guide.
Figure 15:
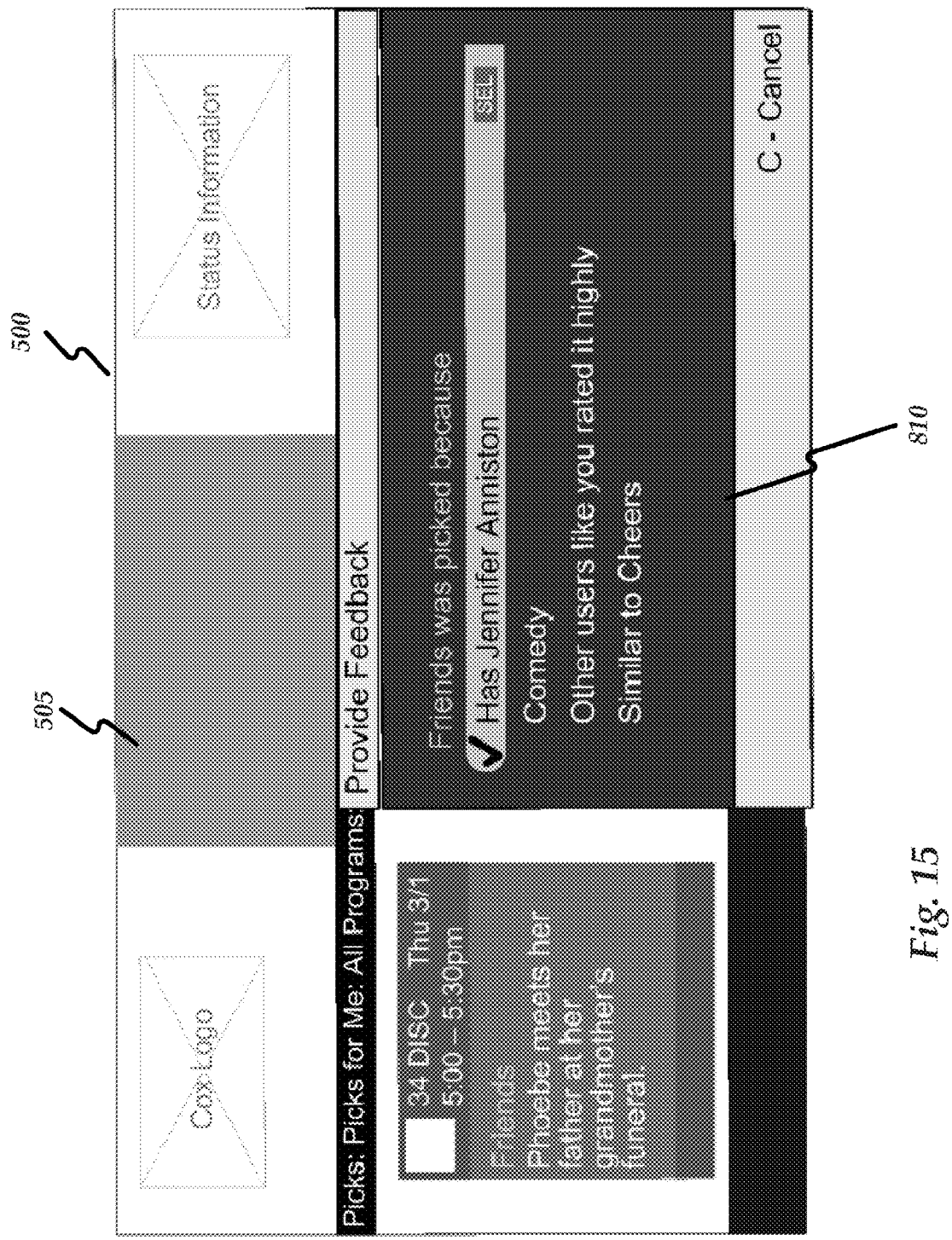
FIG. 15 is a diagram illustrating a media guide.

Regarding the rate & feedback" action, if "rate & feedback" is selected plurality of actions 1210, the user may be given the option to provide a rating or provide feedback for the program corresponding to the program name selected from third card 525. This rating and/or feedback may be used to rate the selected program or may be shared with other users. For example, the rating and/or feedback may be used in the aforementioned recommendation process with respect to the program name selected from third card 525. With respect to providing feedback, a question screen 1305 may be navigated to. From question screen 1305, a question may be selected. Once the question is selected, a slider input 1405 may be displayed in order for the user to enter how positively or negatively the user wishes to respond to the question as shown in FIG. 14 by sliding a slider left/right or up/down in slider input 1405. An acceptance screen 1505 may be displayed to the used to confirm acceptance of the user's feedback as shown in FIG. 15.

Figure 16:
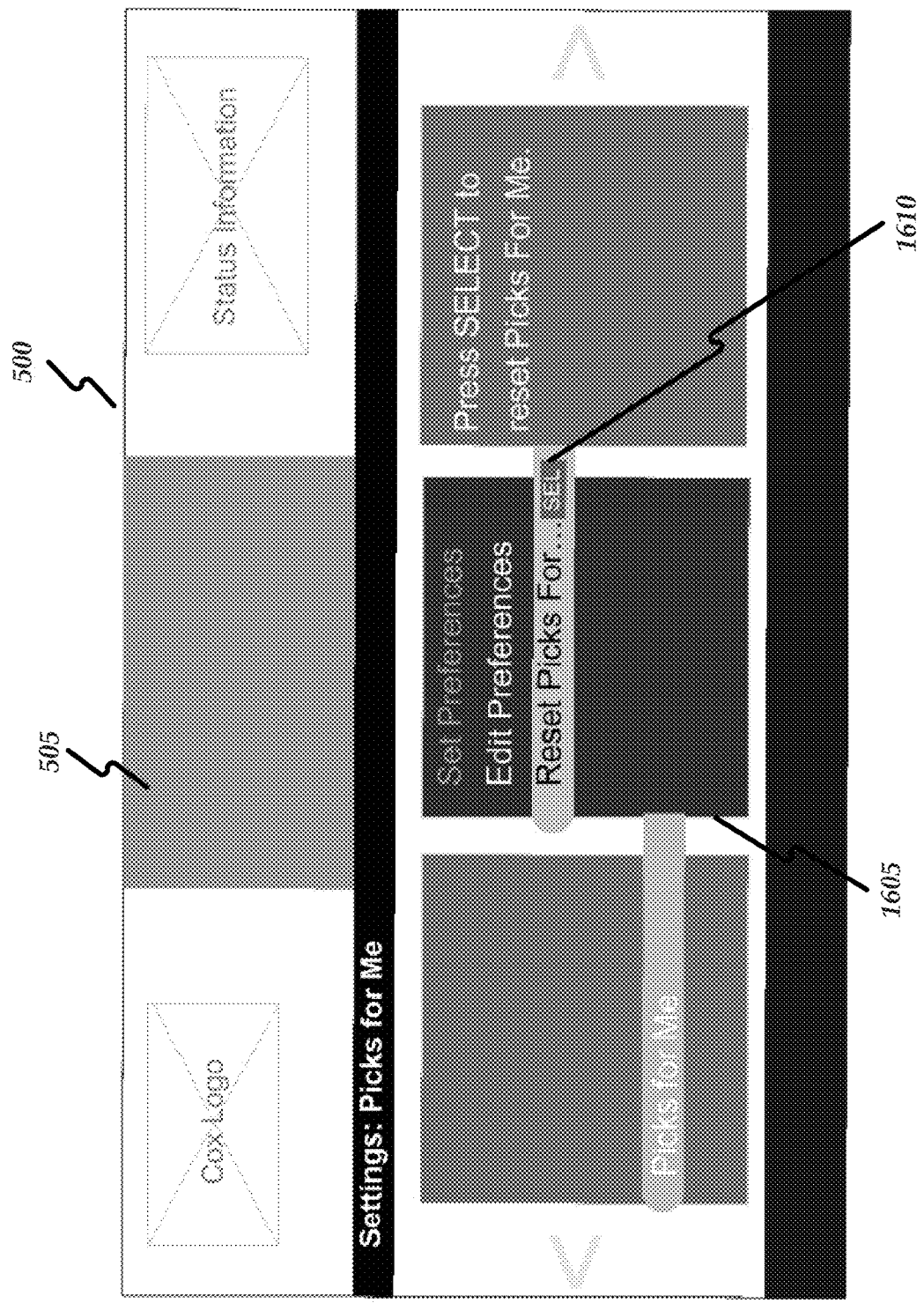
FIG. 16 is a diagram illustrating a media guide.
Figure 17:
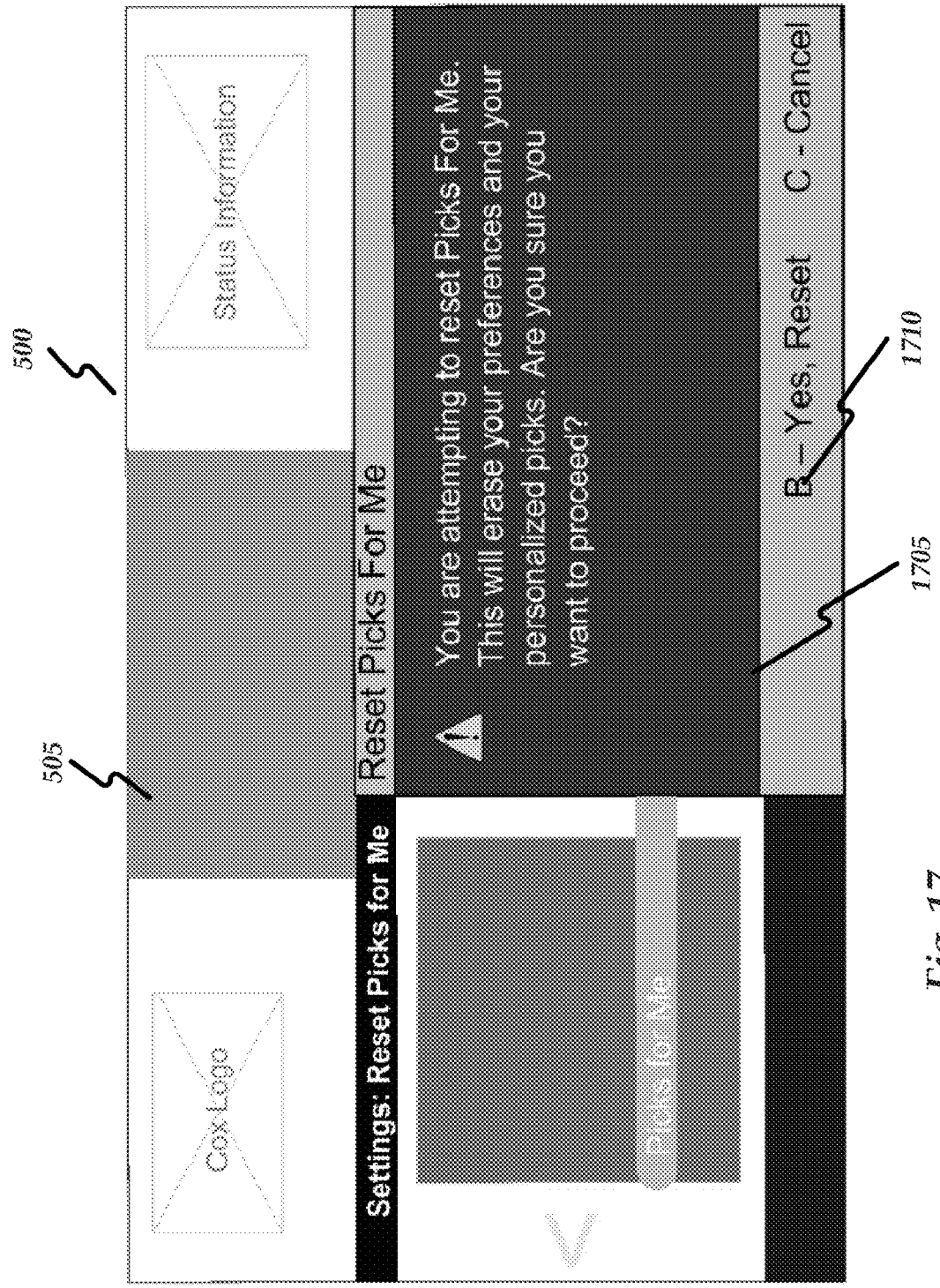
FIG. 17 is a diagram illustrating a media guide.

As stated above, consistent with embodiments of the invention, the user may be given the option to reset the recommendation process in order to cause the recommendation engine to re-analyze with fresh information corresponding to the user. As shown in FIG. 16, the user may navigate to a "picks for me" card 1605 that may include a "reset picks for me" element 1610. Once the user selects "reset picks for me" element 1610, a confirmation screen 1705 may be displayed. The user may select reset button 1710 to reset the recommendation process in order to cause the recommendation engine to re-analyze with fresh information corresponding to the user.

As stated above, first card 515 may comprise a recommendation card. With the media guide consistent with embodiments of the invention, the recommendation card may be navigated to from any structure or view in the media guide and is not limited to the examples shown. In other words, links or entry points to the recommendation card can come from any structure or view in a media guide consistent with embodiments of the invention.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing content recommendations, the method comprising:
   receiving a first input;
   displaying a main menu in response to the received first input;
   receiving a second input corresponding to a content recommendations element from the main menu;
   shrinking, in response to the received second input, a currently displayed programming content;
   displaying the shrunken programming content;
   displaying, in response to the received second input and concurrent with the shrunken programming content, a media guide comprising;
      a first card comprising a plurality of recommendation types comprising picks for me, community picks, critics' picks, picks for kids, and sponsor picks,
      a second card comprising a plurality of subcategories corresponding to a selected one of the plurality of recommendation types from the first card the plurality of subcategories comprising a plurality of options comprising the following: currently airing, all programs, highest rated, most watched, different critics enterprises, children's age ranges, different sponsor enterprises, and content genres, and
      a third card comprising a plurality of content program names corresponding to a selected one of the plurality of subcategories from the second card;
   displaying a button to browse a listing of the plurality of program content names displayed in the third card in at least one of: a poster view and a video view;
   receiving a selection of the button to browse the listing of program content names by the at least one of: the poster view and the video view;
   displaying, in response to the selection of the button to browse the listing of the plurality of program content names by the poster view, a poster corresponding to a program content in each of the first card, the second card, and the third card, wherein displaying the poster corresponding to the program content in each of the first card, the second card, and the third card further comprises displaying a video, in response to the selection to browse the listing of the plurality of program content names by the video view, corresponding to the program content in each of the first card, the second card, and the third card; and
   displaying an action card comprising a plurality of actions comprising watch now, record, program info, browse related, rate & feedback, set reminder, and send to.

2. The method of claim 1, where displaying the media guide comprising the second card comprising the plurality of subcategories comprises displaying the media guide comprising the second card further comprising the plurality of subcategories comprising all programs and currently airing.

3. The method of claim 1, wherein displaying the action card further comprises displaying the action card wherein the actions displayed are a function of a program type corresponding to a selected one of the plurality of content program names from the third card.

4. The method of claim 1, wherein displaying the action card further comprises displaying the action card wherein the actions displayed are a function of a program type corresponding to a selected one of the plurality of content program names from the third card, the program type comprising one of the following: linear, on demand, and recorded on a user's digital video recorder.

5. The method of claim 1, wherein displaying the action card further comprises displaying the action card wherein the actions displayed are a function of a program type corresponding to a selected one of the plurality of content program names from the third card and the plurality of actions are placed in an order of relevance based on the program type.

6. The method of claim 1, where displaying the media guide comprises displaying the second card to the right of the first card and placing the third card to the right of the second card.

7. The method of claim 1, wherein displaying the poster corresponding to the program content in each of the first card, the second card, and the third card comprises displaying a plurality of posters in the poster view, the plurality of posters corresponding to respective ones of the plurality of content program names.

8. The method of claim 1, where displaying the third card comprising the plurality of content program names comprises displaying the plurality of content program names in one of the following orders: most highly recommended, highest rated, most watched, alphabetical, chronological, and vendor specified.

9. The method of claim 1, wherein displaying the shrunken programming content concurrently with the media guide comprises displaying the shrunken programming content concurrently with the media guide to fit at least the width of a high-definition television (HDTV) display.

10. The method of claim 1, further comprising:
receiving a reset input; and
resetting, in response to the reset input, a recommendation process configured to cause a recommendation engine to re-analyze with fresh information corresponding to a user.

11. A non-transitory computer-readable medium which stores a set of instructions which when executed performs a method for providing content recommendations, the method executed by the set of instructions comprising:
receiving a first input;
displaying a main menu in response to the received first input;
receiving a second input corresponding to a content recommendations element from the main menu;
shrinking, in response to the received second input, a currently displayed programming content;
displaying the shrunken programming content;
displaying, in response to the received second input and concurrent with the shrunken programming content, a media guide comprising;
a first card comprising a plurality of recommendation types comprising picks for me, community picks, critics' picks, picks for kids, and sponsor picks,
a second card comprising a plurality of subcategories corresponding to a selected one of the plurality of recommendation types from the first card the plurality of subcategories comprising a plurality of options comprising the following: currently airing, all programs, highest rated, most watched, different critics enterprises, children's age ranges, different sponsor enterprises, and content genres, and
a third card comprising a plurality of content program names corresponding to a selected one of the plurality of subcategories from the second card;
displaying a button to browse a listing of the plurality of program content names
displayed in the third card in at least one of: a poster view and a video view;
receiving a selection of the button to browse the listing of program content names by the at least one of: the poster view and the video view;
displaying, in response to the selection of the button to browse the listing of the plurality of program content names by the poster view, a poster corresponding to a program content in each of the first card, the second card, and the third card, wherein displaying the poster corresponding to the program content in each of the first card, the second card, and the third card further comprises displaying a video, in response to the selection to browse the listing of the plurality of program content names by the video view, corresponding to the program content in each of the first card, the second card, and the third card; and
displaying an action card comprising a plurality of actions comprising watch now, record, program info, browse related, rate & feedback, set reminder, and send to.

12. The non-transitory computer-readable medium of claim 11, where displaying the media guide comprising the second card comprising the plurality of subcategories comprises displaying the media guide comprising the second card further comprising the plurality of subcategories comprising all programs and currently airing.

13. The non-transitory computer-readable medium of claim 11, wherein displaying the action card further comprises displaying the action card wherein the actions displayed are a function of a program type corresponding to a selected one of the plurality of content program names from the third card.

14. The non-transitory computer-readable medium of claim 11, wherein displaying the action card further comprises displaying the action card wherein the actions displayed are a function of a program type corresponding to a selected one of the plurality of content program names from the third card, the program type comprising one of the following: linear, on demand, and recorded on a user's digital video recorder.

15. The non-transitory computer-readable medium of claim 11, wherein displaying the action card further comprises displaying the action card wherein the actions displayed are a function of a program type corresponding to a selected one of the plurality of content program names from the third card and the plurality of actions are placed in an order of relevance based on the program type.

16. The non-transitory computer-readable medium of claim 11, where displaying the media guide comprises displaying the second card to the right of the first card and placing the third card to the right of the second card.

17. The non-transitory computer-readable medium of claim 11, wherein displaying the poster corresponding to the program content in each of the first card, the second card, and the third card comprises displaying a plurality of posters in the poster view, the plurality of posters corresponding to respective ones of the plurality of content program names.

18. The non-transitory computer-readable medium of claim 11, where displaying the third card comprising the plurality of content program names comprises displaying the plurality of content program names in one of the following orders: most highly recommended, highest rated, most watched, alphabetical, chronological, and vendor specified.

19. The non-transitory computer-readable medium of claim 11, wherein displaying the shrunken programming content concurrently with the media guide comprises displaying the shrunken programming content concurrently with the media guide to fit at least the width of a high-definition television (HDTV) display.

20. The non-transitory computer-readable medium of claim 11, further comprising:
receiving a reset input; and
resetting, in response to the reset input, a recommendation process configured to cause a recommendation engine to re-analyze with fresh information corresponding to a user.

21. A system for providing content recommendations, the system comprising:
a memory storage; and
a processing unit coupled to the memory storage, wherein the processing unit is operative to:
receiving a first input;
displaying a main menu in response to the received first input;
receiving a second input corresponding to a content recommendations element from the main menu;
shrinking, in response to the received second input, a currently displayed programming content;
displaying the shrunken programming content;
displaying, in response to the received second input and concurrent with the shrunken programming content, a media guide comprising;
a first card comprising a plurality of recommendation types comprising picks for me, community picks, critics' picks, picks for kids, and sponsor picks, a second card comprising a plurality of subcategories corresponding to a selected one of the plurality of recommendation types from the first card the plurality of subcategories comprising a plurality of options comprising the following: currently airing, all programs, highest rated, most watched, different critics enterprises, children's age ranges, different sponsor enterprises, and content genres, and a third card comprising a plurality of content program names corresponding to a selected one of the plurality of subcategories from the second card;

displaying a button to browse a listing of the plurality of program content names displayed in the third card in at least one of: a poster view and a video view;

receiving a selection of the button to browse the listing of program content names by the at least one of: the poster view and the video view;

displaying, in response to the selection of the button to browse the listing of the plurality of program content names by the poster view, a poster corresponding to a program content in each of the first card, the second card, and the third card, wherein displaying the poster corresponding to the program content in each of the first card, the second card, and the third card further comprises displaying a video, in response to the selection to browse the listing of the plurality of program content names by the video view, corresponding to the program content in each of the first card, the second card, and the third card; and displaying an action card comprising a plurality of actions comprising watch now, record, program info, browse related, rate & feedback, set reminder, and send to.

22. The system of claim 21, where the processing unit being operative to display the media guide comprising the second card comprising the plurality of subcategories comprises the processing unit being operative to display the media guide comprising the second card further comprising the plurality of subcategories comprising all programs and currently airing.

23. The system of claim 21, wherein the processing unit being operative to display the action card further comprises the processing unit being operative to display the action card wherein the actions displayed are a function of a program type corresponding to a selected one of the plurality of content program names from the third card.

\* \* \* \* \*